United States Patent
Calmon et al.

(10) Patent No.: US 10,009,259 B2
(45) Date of Patent: *Jun. 26, 2018

(54) MULTI-PATH DATA TRANSFER USING NETWORK CODING

(71) Applicant: Massachusetts Institute of Technology, Cambridge, MA (US)

(72) Inventors: Flavio du Pin Calmon, White Plains, NY (US); Jason M. Cloud, Cambridge, MA (US); Muriel Médard, Belmont, MA (US); Weifei Zeng, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/358,776

(22) Filed: Nov. 22, 2016

(65) Prior Publication Data

US 2017/0237652 A1    Aug. 17, 2017

Related U.S. Application Data

(63) Continuation of application No. 13/754,398, filed on Jan. 30, 2013, now Pat. No. 9,537,759.

(Continued)

(51) Int. Cl.
| | |
|---|---|
| *H04L 12/707* | (2013.01) |
| *H04B 7/155* | (2006.01) |
| *H04L 1/00* | (2006.01) |

(52) U.S. Cl.
CPC ......... *H04L 45/24* (2013.01); *H04B 7/15521* (2013.01); *H04L 1/0041* (2013.01); *H04L 1/0076* (2013.01)

(58) Field of Classification Search
None
See application file for complete search history.

(56) References Cited

U.S. PATENT DOCUMENTS

| | | | |
|---|---|---|---|
| 5,577,056 | A | 11/1996 | Malik et al. |
| 6,128,773 | A | 10/2000 | Snider |
| | | (Continued) | |

FOREIGN PATENT DOCUMENTS

| | | |
|---|---|---|
| EP | 1 638 239 A1 | 3/2006 |
| WO | WO 2007/109216 A1 | 9/2007 |
| | (Continued) | |

OTHER PUBLICATIONS

U.S. Appl. No. 15/427,536, filed Feb. 8, 2017, Medard et al.

(Continued)

*Primary Examiner* — Chirag Shah
*Assistant Examiner* — Srinivasa Reddivalam
(74) *Attorney, Agent, or Firm* — Daly, Crowley, Mofford & Durkee, LLP

(57) ABSTRACT

Techniques, devices, systems, and protocols are disclosed herein that relate to data transfer between communication nodes via multiple heterogeneous paths. In various embodiments, network coding may be used to improve data flow and reliability in a multiple path scenario. Transmission control protocol (TCP) may also be used within different paths to further enhance data transfer reliability. In some embodiments, multiple levels of network coding may be provided within a transmitter in a multiple path scenario, with one level being applied across all paths and another being applied within individual paths.

28 Claims, 19 Drawing Sheets

Related U.S. Application Data

(60) Provisional application No. 61/592,746, filed on Jan. 31, 2012.

(56) References Cited

U.S. PATENT DOCUMENTS

| | | | |
|---|---|---|---|
| 6,621,851 | B1 | 9/2003 | Agee et al. |
| 6,885,653 | B2 | 4/2005 | Choi et al. |
| 7,064,489 | B2 | 6/2006 | Price |
| 7,071,853 | B2 | 7/2006 | Price |
| 7,095,343 | B2 | 8/2006 | Xie et al. |
| 7,164,691 | B2 | 1/2007 | Knapp et al. |
| 7,283,564 | B2 | 10/2007 | Knapp et al. |
| 7,349,440 | B1 | 3/2008 | Chou et al. |
| 7,408,938 | B1 | 8/2008 | Chou et al. |
| 7,414,978 | B2 | 8/2008 | Lun et al. |
| 7,529,198 | B2 | 5/2009 | Jain et al. |
| 7,706,365 | B2 | 4/2010 | Effros et al. |
| 7,760,728 | B2 | 7/2010 | Chou et al. |
| 7,821,980 | B2 | 10/2010 | Chakrabarti et al. |
| 7,876,677 | B2 | 1/2011 | Cheshire |
| 7,912,003 | B2 | 3/2011 | Radunovic et al. |
| 7,945,842 | B2 | 5/2011 | He |
| 8,040,836 | B2 | 10/2011 | Wu et al. |
| 8,068,426 | B2 | 11/2011 | Sundararajan et al. |
| 8,130,776 | B1 | 3/2012 | Sundararajan et al. |
| 8,279,781 | B2 | 10/2012 | Lucani et al. |
| 8,451,756 | B2 | 5/2013 | Lucani et al. |
| 8,482,441 | B2 | 7/2013 | Medard et al. |
| 8,504,504 | B2 | 8/2013 | Liu |
| 8,571,214 | B2 | 10/2013 | Lima et al. |
| 8,780,693 | B2 | 7/2014 | Kim et al. |
| 9,019,643 | B2 | 4/2015 | Medard et al. |
| 9,025,607 | B2 | 5/2015 | Zeger et al. |
| 9,137,492 | B2 | 9/2015 | Lima et al. |
| 9,143,274 | B2 | 9/2015 | Zeger et al. |
| 9,160,687 | B2 | 10/2015 | Haeupler et al. |
| 9,185,529 | B2 | 11/2015 | Medard et al. |
| 9,253,608 | B2 | 2/2016 | Medard et al. |
| 9,271,123 | B2 | 2/2016 | Medard et al. |
| 9,294,113 | B2 | 3/2016 | Feizi-Khankandi et al. |
| 9,361,936 | B2 | 6/2016 | Medard et al. |
| 9,369,255 | B2 | 6/2016 | Medard et al. |
| 9,369,541 | B2 | 6/2016 | Medard et al. |
| 9,537,759 | B2 | 1/2017 | Calmon et al. |
| 9,544,126 | B2 | 1/2017 | Zeger et al. |
| 9,559,831 | B2 | 1/2017 | Zeger et al. |
| 9,607,003 | B2 | 3/2017 | Medard et al. |
| 2003/0055614 | A1 | 3/2003 | Pelikan |
| 2003/0214951 | A1 | 11/2003 | Joshi et al. |
| 2004/0203752 | A1 | 10/2004 | Wojaczynski et al. |
| 2005/0010675 | A1 | 1/2005 | Jaggi et al. |
| 2005/0078653 | A1 | 4/2005 | Agashe et al. |
| 2005/0152391 | A1 | 7/2005 | Effros et al. |
| 2005/0251721 | A1 | 11/2005 | Ramesh et al. |
| 2006/0020560 | A1 | 1/2006 | Rodriguez et al. |
| 2006/0146791 | A1 | 7/2006 | Deb et al. |
| 2006/0224760 | A1 | 10/2006 | Yu et al. |
| 2007/0046686 | A1 | 3/2007 | Keller |
| 2007/0116027 | A1 | 5/2007 | Ciavaglia et al. |
| 2007/0274324 | A1 | 11/2007 | Wu et al. |
| 2008/0043676 | A1 | 2/2008 | Mousseau et al. |
| 2008/0049746 | A1 | 2/2008 | Morrill et al. |
| 2008/0123579 | A1 | 5/2008 | Kozat et al. |
| 2008/0259796 | A1 | 10/2008 | Abousleman et al. |
| 2008/0291834 | A1 | 11/2008 | Chou et al. |
| 2008/0320363 | A1 | 12/2008 | He |
| 2009/0003216 | A1* | 1/2009 | Radunovic ............ H04L 45/123 370/237 |
| 2009/0135717 | A1 | 5/2009 | Kamal et al. |
| 2009/0153576 | A1 | 6/2009 | Keller |
| 2009/0175320 | A1 | 7/2009 | Haustein et al. |
| 2009/0198829 | A1 | 8/2009 | Sengupta et al. |
| 2009/0207930 | A1 | 8/2009 | Sirkeci et al. |
| 2009/0238097 | A1 | 9/2009 | Le Bars et al. |
| 2009/0248898 | A1 | 10/2009 | Gkantsidis et al. |
| 2009/0285148 | A1 | 11/2009 | Luo et al. |
| 2009/0310582 | A1 | 12/2009 | Beser |
| 2009/0313459 | A1 | 12/2009 | Horvath |
| 2009/0316763 | A1 | 12/2009 | Erkip et al. |
| 2010/0014669 | A1 | 1/2010 | Jiang |
| 2010/0046371 | A1* | 2/2010 | Sundararajan .......... H04L 1/004 370/235 |
| 2010/0054164 | A1* | 3/2010 | Lucani ................. H04L 1/0041 370/294 |
| 2010/0111165 | A1 | 5/2010 | Kim et al. |
| 2010/0146357 | A1 | 6/2010 | Larsson |
| 2011/0238855 | A1 | 9/2011 | Korsunsky et al. |
| 2011/0243324 | A1 | 10/2011 | Lima et al. |
| 2012/0057636 | A1 | 3/2012 | Tian et al. |
| 2012/0218891 | A1 | 8/2012 | Sundararajan et al. |
| 2012/0300692 | A1 | 11/2012 | Sfar et al. |
| 2013/0077501 | A1* | 3/2013 | Krishnaswamy ..... H04L 47/193 370/252 |
| 2013/0107764 | A1 | 5/2013 | Zeger et al. |
| 2013/0114481 | A1 | 5/2013 | Kim et al. |
| 2013/0114611 | A1 | 5/2013 | Zeger et al. |
| 2013/0195106 | A1 | 8/2013 | Calmon et al. |
| 2015/0256354 | A1 | 9/2015 | Zeger et al. |
| 2015/0372809 | A1 | 12/2015 | Lima et al. |
| 2016/0006676 | A1 | 1/2016 | Haeupler et al. |
| 2016/0154970 | A1 | 6/2016 | Calmon et al. |
| 2016/0157127 | A1 | 6/2016 | Zeger et al. |
| 2016/0302134 | A1 | 10/2016 | Kim et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159570 A1 | 10/2014 |
| WO | WO 2014/160194 A3 | 10/2014 |

OTHER PUBLICATIONS

PCT International Search Report and Written Opinion of the ISA for Appl. No. PCT/US2013/24039 dated Jan. 31, 2013.

PCT International Search Report of the ISA for PCT/US2009/055359 dated Mar. 30, 2011.

PCT Written Opinion of the ISA for PCT/US2009/055359 dated Mar. 30, 2011.

International Preliminary Report on Patentability of the ISA for PCT/US2009/055359 dated Apr. 21, 2011.

"Data Service Options for Spread Spectrum Systems: Radio Link Protocol Type 3;" 3GPP2 C.S0017-010-A; Version 2.0; Sep. 2005.

"Guest Editorial Wireless Video Transmission;" IEEE Journal on Selected Areas in Communications; vol. 28; No. 3; Apr. 2010; pp. 297-298.

Abichar, et al.; "WiMax vs. LTE: Who Will Lead the Broadband Mobile Internet?;" Mobile Computing; IEEE Computer Society; IT Pro May/Jun. 2010; pp. 26-32.

AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.

Acedanski, et al.; "How Good is Random Linear Coding Based Distributed Network Storage?;" Proc. 1$^{st}$ Workshop on Network Coding, Theory, and Applications (Netcod'05); Apr. 2005; 6 pages.

Adamson, et al.; "Multicast Negative-Acknowledgment (NACK) Building Blocks;" Internet Engineering Task Force (IETF),RFC; vol. 5401; Nov. 2008; 42 pages.

Adamson, et al.; "NACK-Oriented Reliable (NORM) Transport Protocol;" Internet Engineering Task Force (IETF); RFC; vol. 5740; Nov. 2009; 94 pages.

(56) References Cited

OTHER PUBLICATIONS

Adamson, et al.; "Quantitative Prediction of NACK-Oriented Reliable Multicast (NORM) Feedback;" Proceedings, MILCOM 2000; vol. 2; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Proc. of the $25^{th}$ IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; pp. 1-16.

Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proceedings of the $41^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.
Deb, et al.; "On Random Network Coding Based Information Dissemination;" Proc. of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.

(56) References Cited

OTHER PUBLICATIONS

Dimakis, et al.; "A Survey on Network Codes for Distributed Storage;" Proceedings of the IEEE; vol. 99; No. 3; Mar. 2011; pp. 476-489.
Dimakis, et al.; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 40$^{th}$ Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; 48$^{th}$ Annual Allerton Conference, IEEE; Sep. 29, 2010; pp. 152-159.
Feizi, et al.; "On Network Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" 47$^{th}$ Annual Allerton Conference, IEEE; Sep. 30, 2009; pp. 447-454.
Feizi, et al; "Cases Where Finding a Minimum Entropy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012; pp. 517-524.
Ford; "Architectural Guidelines for Multipath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunities & Challenges;" MILCOM; Oct. 2007; 8 pages.
Frossard, et al.; "Media Streaming With Network Diversity;" Invited Paper; Proceedings of the IEEE; vol. 96, No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The 27$^{th}$ Conference on Computer Communications IEEE; Apr. 13-18, 2008; 5 pages.
Gheorghiu, et al.; " Multipath TCP with Network Coding for Wireless Mesh Networks;" IEEE Communications (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.
Golrezaei, et al.; "FemtoCaching: Wireless Video Content Delivery Through Distributed Caching Helpers;" arXiv:1109.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000; pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Network Coding Gossip Made Easy;" Proc. of the 43$^{rd}$ Symposium on Theory of Computing (STOC); Jan. 2011, 13 pages.
Haeupler, et al.; "Optimality of Network Coding in Packet Networks;" ArXiv, Feb. 17, 2011; 5 pages.
Haley, et. al.; "Reversible Low-Density Parity-Check Codes;" IEEE Transactions on Information Theory; vol. 55; No. 5; May 2009; pp. 2016-2036.
Halloush, et al.; "Network Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.
Han, et al.; "On Nework Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Network Coding from a Network Flow Perspective;" ISIT; Jun.-Jul. 2003; 6 pages.
Ho, et al.; "On Randomized Network Coding;" Proceedings of 41$^{st}$ Annual Allerton Conference on Communications, Control and Computing; Oct. 2003; 10 pages.
Ho, et al.; "On the utility of network coding in dynamic environments;" International Workshop on Wireless AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling: FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.

(56) References Cited

OTHER PUBLICATIONS

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1 ; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in The Air: Practical Wireless Network Coding;" ACM SIGCOMM '06; Computer Communications Review; vol. 36; Sep. 11-15, 2006; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et. al.; "Modeling Network Coded TCP Throughput: A Simple Model and its Validation", arXiv: 1008.0420v1 [cs.IT] Aug. 2, 2010; 9 pages.
Kim, et. al.; "Modeling Network Coded TCP Throughput: A Simple Model and its Validation", Nov. 2010, Presentation; 19 pages.

Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFi Delivery of Layered-Coding Media using Inter-layer Network Coding; "Distributed Computing Systems (ICDCS); 2011 $31^{st}$ International Conference on Jun. 2011; 11 pages.
Kritzner, et al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{rd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE $63^{rd}$;vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The $27^{th}$ Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

(56) References Cited

OTHER PUBLICATIONS

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Presentation; Jun. 16, 2009; 17 pages.

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al; "Random Linear Network Coding for Time-Division Duplexing: Queueing Analysis;" Conference ISIT 2009, Seoul, Korea; Jul. 2009; 5 pages.

Lucani et al; "Random Linear Network Coding for Time-Division Duplexing: Field Size Considerations;" Conference: GLOBECOM 2009, Hawaii, USA; Dec. 2009; 6 pages.

Lucani, et al.; "Network Coding for Data Dissemination: It Is Not What You Know, But What Your Neighbors Don't Know;" Modeling and Optimization in Mobile, AdHoc, and Wireless Networks 2009; WiOPT 2009; 7$^{th}$ International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; Systematic Network Coding for Time-Division Duplexing; Proceedings of the IEEE International Symposium on Information Theory (ISIT); ; Jun. 13-18, 2010; pp. 2403-2407.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation; Massachusetts Institute of Technology; Jun. 2006; 130 pages.

Magli, et al.; "An Overview of Network Coding for Multimedia Streaming;" IEEE International Conference; Jun. 28, 2009; pp. 1488-1491.

Mallat, et al.; "Adaptive Covariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the 44$^{th}$ Allerton Conference on Communication, Control, and Computing; Sep. 2006; 10 pages.

Médard, et al.; "On Coding for Non-Multicast Networks;" invited paper, 41$^{st}$ Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security Issues in Multicast Communications;" IEEE Network; vol. 13; No. 6; Nov./Dec. 1999; pp. 12-23.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59, Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

ParandehGheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoor and Mobile Radio Communications, 2009 IEEE 20$^{th}$ International Symposium on Sep. 13-16, 2009; 5 pages.

Radunovic, et al.; "Horizon: Balancing TCP Over Multiple Paths in Wireless Mesh Network;" Proc. 14$^{th}$ ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at The 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

(56) References Cited

OTHER PUBLICATIONS

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Rezaee, et.al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al.; "Polynomial Time Algorithms for Network Information Flow;" $15^{th}$ ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 pages.
Servetto, et al.; "Constrained Random Walks on Random Graphs: Routing Algorithms for Large Scale Wireless Sensor Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields; "The Interactions Between Ergodic Theory and Information Theory;" IEEE Transactions on Information Theory, vol. 44, No. 6; Oct. 1998; pp. 2079-2093.
Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/ Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. $43^{rd}$ Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al.; "Greening the Internet with Nano Data Centers;" Proc. $5^{th}$ International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; Apr. 2008; pp. 1517-1525.

(56) References Cited

OTHER PUBLICATIONS

Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieselthier, et al.; "Energy Efficient Broadcast and Multicast Trees in Wireless Networks;" Mobile Networks and Applications 7; Jan. 2002; pp. 481-492.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995; pp. 412-422.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 The 28$^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
PCT International Preliminary Report on Patentability with Written Opinion for PCT/US2013/024039 dated Aug. 14, 2014 7 Pages.
European Extended Search Report dated Aug. 7, 2015 corresponding to European Application No. 13742964.3; 11 Pages.
Tomozei et al., "First Report on Novel Protocol Components with Network Coding;" Network Coding for Robust Architectures in Volatile Environments: Collaborate Project, No. 215252; Submitted Jan. 15, 2010; 78 Pages.
Zhuoqun et al., "An Improved MPTCP in Coded Wireless Mesh Networks;" Proceedings of the 2$^{nd}$ IEEE International Conference on Broadband Network and Multimedia Technology; Oct. 18, 2009; 6 Pages.
Response (with Amended Claims) to European Office Action dated Apr. 8, 2016 corresponding to European Application No. 13742964.3; Response filed on Jun. 20, 2016; 12 Pages.
U.S. Non-Final Office Action dated Jun. 30, 2015 corresponding to U.S. Appl. No. 13/754,398; 29 Pages.
Response to U.S. Non-Final Office Action dated Jun. 30, 2015 corresponding to U.S. Appl. No. 13/754,398; Response filed Oct. 29, 2015; 13 Pages.
U.S. Final Office Action dated Feb. 16, 2016 corresponding to U.S. Appl. No. 13/754,398; 21 Pages.
Response to U.S. Final Office Action dated Feb. 16, 2016 corresponding to U.S. Appl. No. 13/754,398; Response filed on Aug. 12, 2016; 7 Pages.
Notice of Allowance dated Aug. 25, 2016 corresponding to U.S. Appl. No. 13/754,398; 8 Pages.
Response to Communication under Rule 71 (3) dated Aug. 8, 2017 from European Patent Application No. 13742964.3 as filed on Nov. 20, 2017; 6 Pages.
Communication Under Rule 71(3) EPC dated Dec. 14, 2017 from European Appl. No. 13742964.3; 66 Pages.

\* cited by examiner

MULTI-PATH DATA TRANSFER USING NETWORK CODING

CROSS REFERENCE TO RELATED APPLICATION

The present application is a continuation of co-pending U.S. patent application Ser. No. 13/754,398 filed on Jan. 30, 2013, which claims the benefit of U.S. Provisional Patent Application No. 61/592,746 filed on Jan. 31, 2012, both of which are incorporated by reference herein in their entireties.

GOVERNMENT RIGHTS

This invention was made with government support under Contract No. FA8721-05-C-0002 awarded by the U.S. Air Force and under Grant No. FA9550-09-1-0196 awarded by the Air Force Office of Scientific Research. The government has certain rights in the invention.

FIELD

Subject matter disclosed herein relates generally to data communications and, more particularly, to techniques, systems, and protocols for use in transferring data between locations via multiple different paths.

BACKGROUND

Modern communication devices (e.g., smart phones and other handheld communicators, tablet computers with communication functionality, etc.) often possess multiple network interfaces for use with different network technologies having different connectivity characteristics. The different network technologies may each have, for example, different delay, throughput, and reliability characteristics. A mobile device that is connected to a remote source node through both a 3G network and an IEEE 802.11 wireless LAN may, for example, observe different usage costs and quality of service through each interface. It would be desirable to be able to utilize multiple available network resources to carry out a data transfer operation for a communication device to, for example, increase throughput, decrease data transit time, and/or make efficient use of available resources. It would also be desirable if this could be done in a reliable and efficient manner that takes advantage of already existing communication techniques and protocols.

SUMMARY

Techniques, devices, systems, and protocols are described herein that support efficient and reliable data transfer between communication nodes via multiple different paths involving different network technologies. A novel transport layer protocol is proposed (i.e., the Multi-Path Transfer Control Protocol with Network Coding protocol or MPTCP/NC) that may be used to coordinate several parallel connections over multiple interfaces/networks. The proposed protocol incorporates some features of the multi-path TCP (MPTCP) protocol introduced by the Internet Engineering Task Force (IETF), but builds on the protocol to allow many of the benefits of network coding to be achieved in a multi-path scenario. It has been shown through simulation that the techniques described herein are capable of achieving a significant improvement in data transfer completion times and average transfer rates over other known multi-path approaches. Simulations have also shown that the techniques are more robust and reliable to link failure and variation than other multi-path schemes.

In accordance with one aspect of the concepts, systems, circuits, and techniques described herein, a machine implemented method for use in transferring data to a destination node comprises: obtaining a plurality of original data packets to be transferred to the destination node; generating first coded packets by linearly combining original data packets using network coding; distributing the first coded packets among multiple available paths leading to the destination node; generating second coded packets by linearly combining first coded packets distributed to a first path of the multiple available paths, using network coding; and transmitting the second coded packets associated with the first path to the destination node via a network associated with the first path.

In one embodiment, the method further comprises: generating second coded packets by linearly combining first coded packets distributed to a second path of the multiple available paths, using network coding; and transmitting the second coded packets associated with the second path to the destination node via a network associated with the second path.

In one embodiment, generating first coded packets includes generating first coded packets by linearly combining original data packets that are within a sliding coding window. In one embodiment, the sliding coding window has a variable width. In one embodiment, the method further comprises: receiving acknowledgement messages from the destination node that each indicate that a new degree of freedom has been received by the destination node in connection with the data transfer; and adjusting the width of the sliding coding window based, at least in part, on received acknowledgement messages.

In one embodiment, generating second coded packets includes generating second coded packets by linearly combining first coded packets that are within a sliding coding window. In one embodiment, generating second coded packets includes generating redundant second coded packets for each set of first coded packets within the sliding coding window.

In one embodiment, each of the multiple available paths includes a transmission control protocol (TCP) layer that adds sequence numbers to first coded packets distributed to the path, wherein generating second coded packets by linearly combining first coded packets masks the sequence numbers added to the first coded packets associated with a path.

In one embodiment, each of the multiple available paths includes a transmission control protocol (TCP) layer; and distributing the first coded packets includes distributing the first coded packets among the multiple available paths based, at least in part, on TCP congestion control window dynamics.

In one embodiment, the multiple available paths are associated with different network technologies.

In one embodiment, obtaining a plurality of original data packets includes receiving the original data packets from an application layer.

In accordance with another aspect of the concepts, systems, circuits, and techniques described herein, a machine implemented method for use in processing coded packets received from a source node via multiple different paths comprises: receiving coded packets associated with a first connection via multiple different paths, the coded packets each including a linear combination of original data packets;

for each coded packet associated with the first connection that is successfully received, sending an acknowledgement message to the source node without first determining whether the coded packet is linearly independent of previously received coded packets associated with the first connection; forwarding all coded packets associated with the first connection, received from all paths, to a common processing layer without decoding the coded packets; and for each coded packet associated with the first connection forwarded to the common processing layer: (a) determining whether the coded packet is linearly independent of coded packets associated with the connection that were previously forwarded to the common processing layer; and (b) sending an acknowledgement message to the source node acknowledging that a new degree of freedom has been received for the first connection if the coded packet is determined to be linearly independent.

In one embodiment, determining whether the coded packet is linearly independent includes performing a Gauss-Jordan elimination operation on a coefficient matrix.

In one embodiment, receiving coded packets associated with a first connection via multiple different paths includes receiving coded packets from paths that use different network technologies, wherein each of the different paths uses transmission control protocol (TCP) to control a transfer of packets through the path. In one embodiment, sending an acknowledgement message to the source node without first determining whether the coded packet is linearly independent from previously received coded packets is performed as part of a TCP layer. In one embodiment, sending an acknowledgement message to the source node without first determining whether the coded packet is linearly independent of previously received coded packets is performed within a first portion of the TCP layer for coded packets received via a first path and within a second portion of the TCP layer for coded packets received via a second path that is different from the first path.

In one embodiment, the method further comprises discarding a received coded packet if it is determined that the packet is not linearly independent.

In one embodiment, receiving coded packets associated with a first connection via multiple different paths includes receiving first coded packets via a first path following an IEEE 802.16 wireless networking standard and receiving second coded packets via a second path following an LTE wireless cellular standard.

In one embodiment, forwarding all coded packets associated with the first connection to a common processing layer includes forwarding the coded packets to a multiple path transfer control protocol with network coding (MPTCP-NC) layer that is higher than a TCP layer in a corresponding protocol architecture. In one embodiment, the protocol architecture includes separate protocol stacks associated with each of the multiple different paths.

In accordance with still another aspect of the concepts, systems, circuits, and techniques described herein, a communication device comprises: a first network interface unit configured for communication in a first network; a second network interface unit configured for communication in a second network that is different from the first network; and at least one processor to manage data transfer between the communication device and a destination node using multiple different paths, the at least one processor to: (a) obtain a plurality of original packets representative of data to be transferred to the destination node; (b) generate first coded packets by linearly combining original data packets using network coding; (c) distribute first coded packets to the multiple different paths to the destination node; and (d) generate second coded packets within individual paths by linearly combining first coded packets distributed to the path, using network coding.

In one embodiment, the at least one processor is configured to transmit second coded packets generated within individual paths to the destination node via corresponding networks.

In one embodiment, the at least one processor is configured to generate first coded packets by linearly combining original data packets within a sliding coding window.

In one embodiment, the at least one processor is configured to generate second coded packets for a first path by linearly combining first coded packets within a sliding coding window. In one embodiment, the at least one processor is configured to generate redundant second coded packets for the first path for each set of first coded packets within the sliding coding window.

In one embodiment, the at least one processor is configured to distribute the first coded packets to the multiple different paths based, at least in part, on TCP congestion control window dynamics.

In one embodiment, a first of the multiple different paths is associated with the first network interface unit and a second of the multiple different paths is associated with the second network interface unit.

In accordance with a further aspect of the concepts, systems, circuits, and techniques described herein, a communication device comprises: a first network interface unit configured for communication in a first network; a second network interface unit configured for communication in a second network that is different from the first network; and at least one processor to manage processing of coded data packets received from a source node via multiple different paths as part of a first connection, the coded data packets each including a linear combination of original data packets, the at least one processor to: (a) send an acknowledgement message to the source node for each coded data packet associated with the first connection that is successfully received; (b) forward coded data packets associated with the first connection, received from all paths, to a common processing layer without first decoding the coded packets; and (c) for each coded packet associated with the first connection forwarded to the common processing layer: (i) determine whether the coded packet is linearly independent of coded packets associated with the connection that were previously forwarded to the common processing layer; and (ii) send an acknowledgement message to the source node acknowledging that a new degree of freedom has been received for the first connection if the coded packet is determined to be linearly independent.

In one embodiment, the at least one processor is configured to determine whether the coded packet is linearly independent by performing a Gauss-Jordan elimination operation on a coefficient matrix.

In one embodiment, the at least one processor is configured to discard a received coded packet if it is determined that the packet is not linearly independent.

In one embodiment, a first of the multiple different paths is associated with the first network interface unit and a second of the multiple different paths is associated with the second network interface unit.

BRIEF DESCRIPTION OF THE DRAWINGS

The foregoing features may be more fully understood from the following description of the drawings in which.

DETAILED DESCRIPTION

Techniques, devices, systems, protocols described herein relate to the transfer of data between communication nodes via multiple heterogeneous paths. In various embodiments, network coding is used to improve data flow and reliability within a multiple path scenario. Transmission control protocol (TCP) may also be implemented within each of the different paths to further enhance data transfer reliability. In some embodiments, multiple levels of network coding may be provided within a transmitter in a multiple path networking scenario, one level that is applied across all of the different paths (or sub-flows) and another level that is applied within each individual path. As will be described in greater detail, a communication protocol (MPTCP/NC) is also described for use in implementing and standardizing these techniques in some embodiments.

Figure 1:
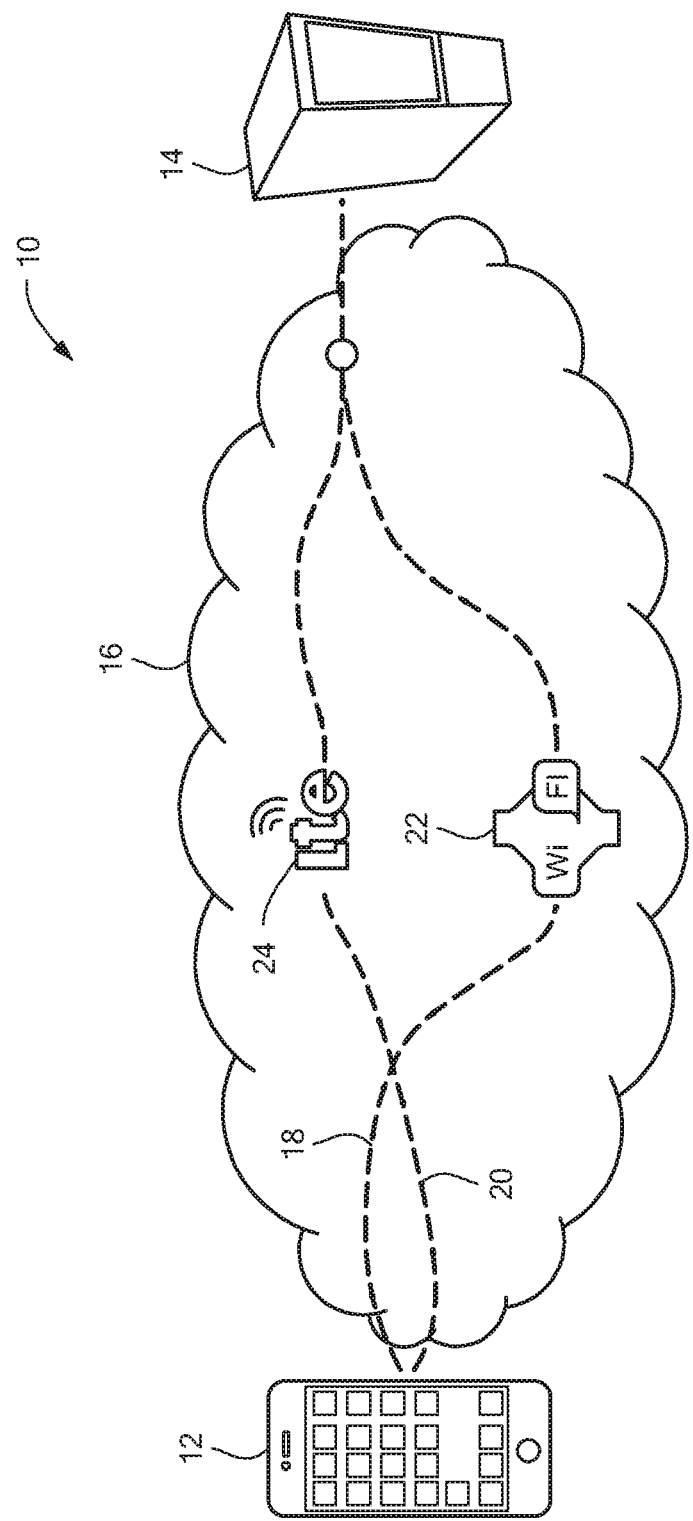
FIG. 1 is a diagram illustrating an exemplary multiple path communication scenario that can utilize one or more of the techniques or features described herein.

FIG. 1 is a diagram illustrating an exemplary multiple path communication scenario 10 that may utilize one or more of the techniques or features described herein. As shown, a first node 12 (e.g., a smart phone) may wish to exchange information with a second node 14 (e.g., a server) via a network cloud 16. As is known, a network cloud 16 may provide multiple different routes or paths that data packets can traverse between the first and second nodes 12, 14. In addition, some of the different routes through the network cloud 16 may involve different network technologies in some cases. For example, in the illustrated embodiment, a first path 18 may exist between the first and second nodes 12, 14 that is associated with a WiFi-based network 22 (i.e., based on the IEEE 802.11 family of wireless networking standards) and a second path 20 may exist that is associated with a long term evolution (LTE) based 4G cellular network 24. To use either of these different paths 18, 20, the first and second nodes 12, 14 would have to include (or have access to) appropriate hardware and software to be able to communicate according to the corresponding standards. Many modern communication devices (e.g., cell phones, smart phones, handheld communicators, computers or servers with communication functionality, network gateways, wireless access points, audio/video devices with communication functionality, appliances with communication functionality, wearable communication devices, etc.) include network adapters for multiple different network technologies.

Figure 2:
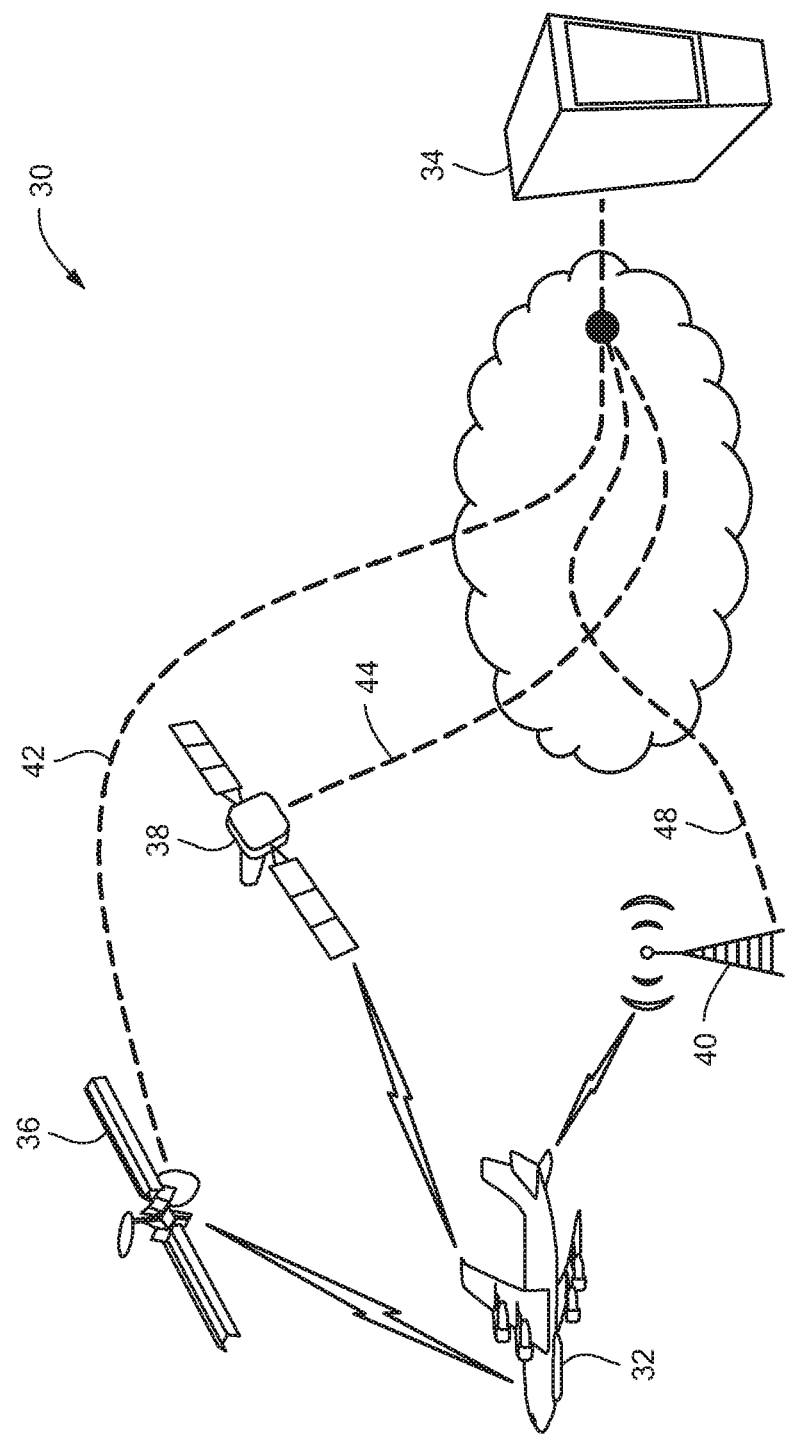
FIG. 2 is a diagram illustrating another exemplary multiple path communication scenario that can utilize one or more of the techniques or features described herein.

FIG. 2 is a diagram illustrating another exemplary multiple path communication scenario 30 that may utilize one or more of the techniques or features described herein. As shown, an aircraft 32 may act as a communication platform or node that is capable of supporting wireless communication in accordance with a number of different technologies, specifications, and/or standards (military and/or commercial). Aircraft 32 may desire to perform a data transfer operation with a remote terrestrial server 34. One or more communication satellites 36, 38 may be within communication range of aircraft 32. Each of these satellites 36, 38 may provide a corresponding path 42, 44 through which aircraft 32 can communicate with server 34. One or more ground stations 40 may also be within communication range of aircraft 32. Ground station 40 may also provide a path 48 through which aircraft 32 can establish communication with remote server 34. The satellites 36, 38 and the ground station 40 may each operate in accordance with a different wireless standard.

In each of the above-described scenarios, it may be possible to use multiple different network technologies to support a single data transfer operation (or a single connection) between communication nodes. The use of multiple different network technologies associated with multiple different paths to support a single data transfer operation or other function may be referred to as "heterogeneous networking." As used herein, phrases such as "network technologies" and "network access technologies" encompass both wireless and wired technologies and can involve various different wireless and/or wire line standards, specifications, and/or protocols. The different wireless standards may include, for example, wireless networking standards, wireless cellular standards, wireless satellite communication standards, infrared communications standards, point to point microwave link technologies, LMDS and MMDS technologies, and/or other forms of wireless standards. Although specific heterogeneous network scenarios are shown in FIGS. 1 and 2, it should be appreciated that the number and type of network technologies used in particular heterogeneous network implementations may vary widely. As described above, various techniques, devices, and systems are described herein that allow heterogeneous network arrangements to be used to facilitate data transfer between two communicating nodes in a system in an efficient and reliable manner.

Transmission control protocol (TCP) is a communication protocol that may be used to provide reliable data stream service between, for example, a source node and a destination node in a network. TCP makes use of positive acknowledgment with retransmission to improve the reliability of data transfer in both accuracy and sequence. A TCP source node may keep a record of each packet transmitted as part of a data transfer operation. After transmitting a packet, the source node may automatically retransmit the packet if an acknowledgement message is not received from the destination node within a predetermined time period. TCP is considered a part of the TCP/IP protocol suite and provides a communication service at an intermediate layer between an application program and the Internet Protocol (IP).

Internet Protocol (IP) typically uses "IP packets" as a vehicle to transfer data between nodes on a physical medium. An IP packet is a sequence of octets that includes both a header and a body. Among other things, the header of an IP packet may include destination node address information to identify a destination of the IP packet. The body of an IP packet may include the data being transferred. When an application program within a first node desires to send a large amount of data to a remote node, the program can split up the data into smaller portions and then issue a series of IP requests to an IP layer to transfer the data. Alternatively, the program can issue a single TCP request and let TCP deal with the IP layer. For various reasons, IP packets can be lost, duplicated, or delivered out of sequence in a network. TCP can detect such problems, request retransmission of lost data, and rearrange packets in a receiver that were delivered out of sequence. TCP can also operate to reduce congestion in a network. Once a TCP-enabled receiver has received and reassembled a number of octets, it may pass them to an application program for use in performing a particular function. The operation of TCP can be relatively transparent to an application.

Network coding is a coding technique that may be used to, among other things, improve information flow in a network. Network coding usually involves the generation of linear combinations of data packets to form "coded packets" for transmission in a network. One form of network coding, known as Random Linear Network Coding (RLNC), uses randomly generated coefficients to form linear combinations of packets (or coded packets) to be transmitted in the network. In some cases, information describing the coefficients used to make the linear combination may be appended to the coded packet before transmission. RLNC has been shown to be a powerful technique for achieving robust, high throughput packet distribution in certain network environments. One example system and method for implementing RLNC is described in U.S. Pat. No. 7,706,365 to Effros et al. entitled "Randomized Distributed Network Coding," which is hereby incorporated by reference in its entirety.

In a network that uses RLNC, a source node that has a number of original data packets to transfer to a destination node may combine the packets together into a "coded packet" that is then transmitted into the network. A destination node in the network that receives the coded packet may then store the packet for eventual decoding. The destination node will typically require a particular number of coded packets before it is able to decode the coded packets to extract the original data packets. The decoding process may involve, for example, the solution of a system of linear equations having a number of independent variables (i.e., the data packets) and a number of independent equations. Before a destination node can reliably solve for the original data packets, the number of "degrees of freedom" (or DOFs) received must equal or exceed the number of original packets. The DOFs missing may in some cases be defined as the number of unknown independent variables of a system of equations less the number of independent equations. In some implementations, each coded packet successfully received at a destination node may provide another equation for use in decoding and thus reduce the number of DOFs needed by the node by one (assuming the coded packet is linearly independent of previously received coded packets). In some networks, a source node may transmit a stream of coded packets until a destination node is able to decode the original data packets.

In developing the techniques, devices, systems, and protocols described herein, it was determined that improved throughput performance and decreased communication delay could be achieved in a network by intelligently combining TCP, network coding, and heterogeneous networking. The techniques, devices, systems, and protocols are also capable of increasing data transfer reliability and decreasing management overhead when transmitting a single source-destination flow over multiple interfaces/networks. Although described herein in connection with network coding, it should be appreciated that some or all of the techniques described herein may use other similar codes in place of, or in addition to, network coding in some implementations (e.g., fountain codes, systematic codes, structured codes, etc.).

Figure 3:
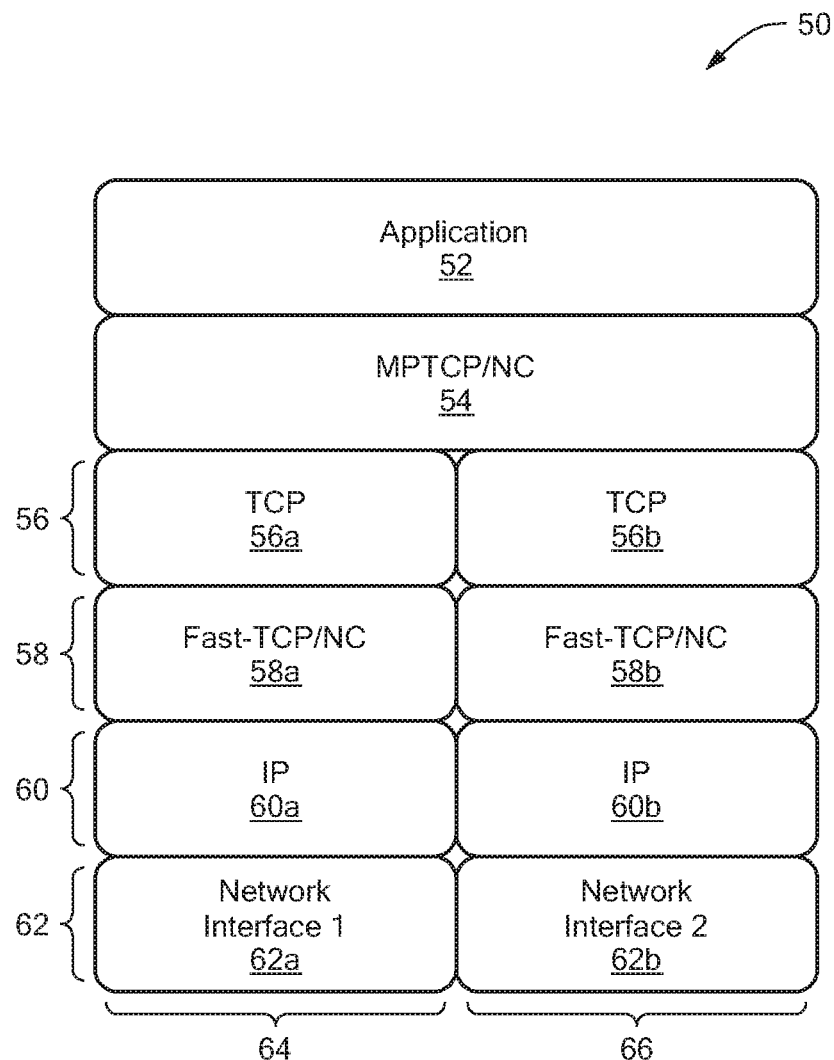
FIG. 3 is a diagram illustrating an exemplary protocol architecture that may be used within a communication system having heterogeneous links in accordance with an embodiment.

FIG. 3 is a diagram illustrating an exemplary protocol architecture 50 that may be used within a communication system having heterogeneous links in accordance with an embodiment. The corresponding protocol will be referred to herein as multi-path TCP with network coding (MPTCP-NC). Protocol architecture 50 may be used to split a data transfer operation involving a source node and a destination node between multiple different heterogeneous communication links (or paths or sub-flows) in certain situations. As will be described in greater detail, protocol architecture 50 may also be used to provide two separate levels of network coding to signals being transferred to a destination node via multiple heterogeneous links. The phrases "data flow" and "connection" may be used herein to refer to a data transfer operation that seeks to transfer a certain amount of data (e.g., a data file of a particular size, etc.) from a source node to a destination node.

As shown in FIG. 3, protocol architecture 50 may include: an application layer 52, an MPTCP/NC layer 54, a TCP (or transport) layer 56, a fast-TCP/NC layer 58, an IP layer 60, and a network interface layer 62. Application layer 52, TCP layer 56, IP layer 60, and network interface layer 62 may perform similar functions to corresponding layers in the basic TCP/IP protocol stack. The MPTCP/NC layer 54 may sit directly above TCP layer 56 in protocol architecture 50. Fast-TCP/NC layer 58 may sit directly below TCP layer 56. Application layer 52 is the highest layer in protocol architecture 50 and is the layer where one or more application programs may be executed that may require one or more communications-related processes to be performed in a corresponding system. MPTPC/NC layer 54 is operative for performing one level of network coding operations for the system and for dividing data transfer operations between the different paths, or sub-flows 64, 66. TCP layer 56 is operative for implementing transmission control protocol within the communication system. Fast-TCP/NC layer 58 is operative for performing a second level of network coding operations for the system and for simplifying the implementation of network coding within the TCP framework. IP layer 60 is operative for providing internet protocol (IP) related services in the communication system. Network interface layer 62 is operative for providing an interface to a physical network medium for the system.

As illustrated, the lower portion of protocol architecture 50 is divided into a number of different "sub-flows" 64, 66 that may each correspond to a different networking technology and a different path between a source node and a destination node. Each sub-flow 64, 66 within protocol architecture 50 may include a corresponding protocol stack. For example, first sub-flow 64 may include a stack with a TCP layer 56a, Fast-TCP/NC layer 58a, IP layer 60a, and network interface layer 62a. Likewise, second sub-flow 66 may include a stack with a TCP layer 56b, Fast-TCP/NC layer 58b, IP layer 60b, and network interface layer 62b. The protocol stack associated with each sub-flow 64, 66 may be used to process communications flowing through the sub-flow 64, 66 for a corresponding networking technology. Thus, if the first sub-flow 64 corresponds to an IEEE 802.11 based network, TCP layer 56a will be used to provide TCP services for the IEEE 802.11-based communications and network interface 62a will be used to interface to a corresponding IEEE 802.11 wireless medium, and so on. Although illustrated in FIG. 3 with only two sub-flows, it should be appreciated that protocol architecture 50 may be implemented with any number of different sub-flows (greater than one) in different implementations.

In a typical communication scenario, an application program within application layer 52 may determine that a large amount of data (e.g., a large data file, etc.) needs to be transferred to a remote destination node. The application program may then transfer some or all of the data to MPTCP/NC layer 54 with instructions to transfer the data to the destination node. MPTCP/NC layer 54 may then apply network coding to the data and then divide the coded data amongst the various sub-flows 64, 66 for transmission to the destination node. Thus, instead of seeing multiple TCP links, application layer 52 only needs to interface with MPTCP/NC layer 54.

In one implementation, the data transferred from application layer 52 to MPTCP/NC layer 54 will include data packets that will be referred to herein as "original packets." As will be described in greater detail, MPTCP/NC layer 54 may process original packets received from application layer 52 using network coding to generate "coded packets." As described previously, coded packets may be generated by forming linear combinations of original packets using, for example, randomly generated coefficients. In one approach, MPTCP/NC layer 54 may generate a new coded packet by linearly combining all original packets that are within a coding buffer of MPTCP/NC layer 54 (i.e., all original packets received so far that are associated with the corresponding connection). In another approach, MPTCP/NC layer 54 may generate a new coded packet by linearly combining all original packets that are within a sliding coding window of MPTCP/NC layer 54. Each new original packet added to the coding window may drive an older original packet out of the window. The coded packets generated by MPTCP/NC layer 54 will be referred to herein as "first coded packets" to distinguish them from subsequently generated coded packets. The sliding coding window of MPTCP/NC layer 54 may have a fixed or variable length in different implementations.

In the discussion that follows, it will be assumed that two or more TCP sub-flows are properly established and managed under a common connection. In at least one implementation, the procedure for initiating and managing multiple TCP sub-flows will be the same as, or similar to, the procedures described in the MPTCP protocol proposed by the IETF (e.g., *MPTCP Application Interface Considerations*, by Scharf at el., draft-ietf-mptcp-api-06, 2012-10-22, which is incorporated by reference herein in its entirety), although other processes may alternatively be used. MPTCP/NC layer 54 may monitor the different TCP sub-flows 64, 66 of protocol architecture 50 to determine when a particular sub-flow is able to receive one or more first coded packets. As TCP transmits packets over the network, its window slides or expands to include new packets. When there is a chance to inject a new coded packet to one of the TCP sub-flows 64, 66, the MPTCP/NC layer 54 may produce a new random linear network coded packet (i.e., a new "first coded packet") and inject the new coded packet to the identified TCP sub-flow.

As described above, in one possible scenario, the MPTCP/NC layer 54 may decide to inject a new coded packet into, for example, sub-flow 64. The TCP layer 56a of sub-flow 64 may operate in a conventional TCP manner as all operations in MPTCP/NC layer 54 and Fast-TCP/NC layer 58a may be transparent to the TCP protocol. However, it should be noted that all packets in the TCP window of TCP layer 56a of protocol architecture 50 will be coded packets (i.e., first coded packets). These packets are pushed from TCP layer 56a to Fast-TCP/NC layer 58a, which maintains another coding window. Fast-TCP/NC layer 58a may then apply a second level of network coding to first coded packets in its coding window to generate second coded packets. For each first coded packet TCP layer 56a sends to Fast-TCP/NC 58a, the latter may produce R second coded packets that are random linear combinations of all first coded packets in its coding window. The second coded packets are eventually passed to IP layer 60a, after which they may be transmitted over a corresponding network (via network interface layer 62a) to a destination node or nodes. Thus, the transmitted packets are twice-encoded packets.

Although packets received by TCP layer 56 are previously coded by MPTCP/NC layer 54, TCP will not be aware of this and will assign sequence numbers to the packets. In a conventional system, the sequence numbers will allow the destination node to determine whether any of the transmitted packets were lost in transit. Due to the nature of network coding, assuming the network coding window is designed correctly, sequence number are no longer necessary to identify packets lost in transit. That is, once enough packets have been successfully received in the destination node, the node will be able to decode the original packets, regardless of the sequence in which the coded packets were transmitted. Thus, the second layer of coding provided by Fast-TCP/NC layer 58a will serve to mask the sequence numbers of the packets added by TCP layer 56a as they are not needed.

Figure 4:
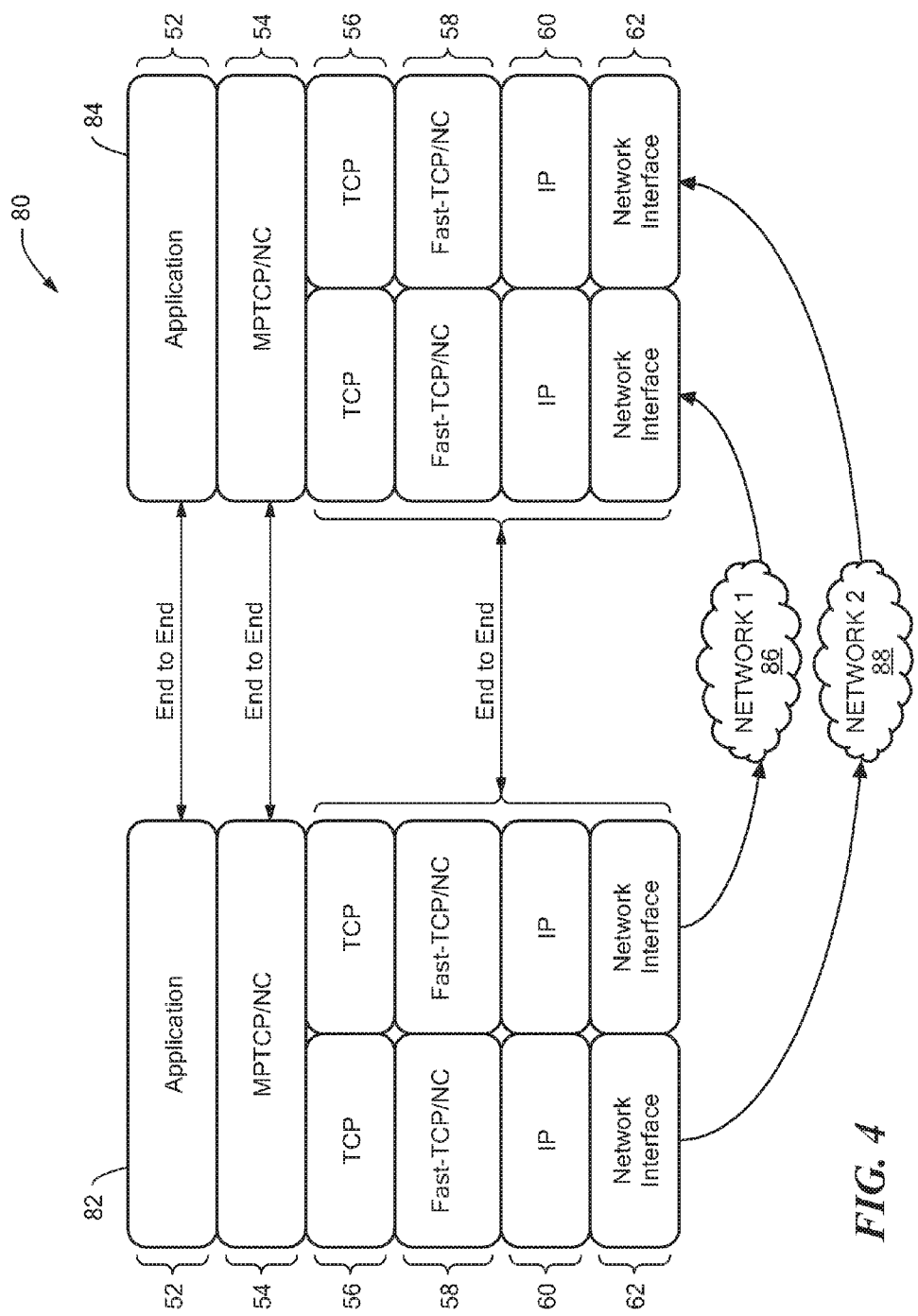
FIG. 4 is a diagram illustrating an exemplary communication scenario involving a transfer of data between a source node and a destination node in accordance with an embodiment.

FIG. 4 is a diagram illustrating an exemplary communication scenario 80 involving a transfer of data between a source node 82 and a destination node 84 that both utilize protocol architecture 50 of FIG. 3 in accordance with an embodiment. As shown, a first network 86 provides a first link (or path) between the nodes 82, 84 and a second network 88 provides a second link (or path) between the nodes 82, 84. These links may be heterogeneous. Referring now to FIG. 4, at the destination node 84, if a twice-encoded packet is successfully received at the Fast-TCP/NC layer 58 (i.e., it is not erased in transit), the layer may immediately send an acknowledgement (ACK) message to the TCP/NC layer 58 of the source node 82. The Fast-TCP/NC layer 58 of destination node 84 may then pass the received packet up the protocol stack. All of the packets delivered by the various TCP sub-flows will eventually reach the MPTCP/NC layer 54 of destination node 84. The MPTCP/NC layer 54 may then perform Gaussian-Jordan elimination (or a similar procedure) progressively as it receives new packets from the different sub-flows.

A received packet is considered "innovative" if it is linearly independent of all previously received packets associated with the connection. If innovative, the packet will contribute a new "degree of freedom" and induce a new "seen packet" after Gaussian-Jordan elimination. Once the MPTCP/NC layer 54 receives an innovative packet from any of the sub-flows, it sends an ACK message (i.e., DATA_ACK) to acknowledge the new degree of freedom to the MPTCP/NC layer 54 of source node 82. Eventually, the MPTCP/NC layer 54 of the destination node 84 collects enough linearly independent packets to allow it to solve the linear system and recover all original packets. The original packets may then be delivered to the application level 52 of the destination node 84.

As described above, the Fast-TCP/NC layer 58 is directly below the transport layer 56. In the Fast-TCP/NC layer 58 of destination node 84, received packets are not checked for linear independence. That is, Gaussian-Jordan elimination is not performed and the seen packet concept is not employed. Instead, for each packet successfully received, regardless of whether it is linearly independent of previously received packets, Fast-TCP/NC layer 58 will automatically send an acknowledgement message back to source node 82. This is because in any particular sub-flow, TCP layer or below, there is no global knowledge of the linear space spanned by the packets received from all sub-flows. Therefore, a linear dependency check will not be efficient at the Fast-TCP/NC layer 58. Instead, Fast-TCP/NC layer 58 may deliver packets upwards to MPTCP/NC layer 54, which does have global knowledge of all packets, to handle the linear independency check and decoding. Furthermore, assuming that the coefficients in the packet header are properly organized and adjusted, the results of the second encoding are just other random linearly encoded packets. These packets can be decoded at the MPTCP/NC layer 54 of destination node 84, without intermediate decoding at the lower level. Since the Fast-TCP/NC layer 58 does not handle linear dependency issues, it may send an ACK every time a packet is received. This is reasonable as packet linear dependency is a problem associated with the coding operation, rather than with link congestion. The fast ACK allows the window management to be more efficient.

The MPTCP/NC layer 54 may maintain a coding window which decides the number of original packets to be coded and pushed to the TCP sub-flows 64, 66. As mentioned above, MPTCP/NC layer 54 has global knowledge of all packets received from all TCP sub-flows. Therefore, Gaussian-Jordan elimination may be carried out here, whenever a packet is received, to check linear dependency. The MPTCP/NC layer 54 of source node 82 receives a DATA_ACK for each degree of freedom received at destination node 84 and may adjust its coding window accordingly. The design of the coding window is very flexible, as is not constrained by the TCP congestion window. For example, the left boundary of the window could slide according to the slowest TCP sub-flow, while the right side of the window can slide when the fastest sub-flow contributes a degree of freedom. This will allow packets delivered by any sub-flow to be innovative with high probability.

Figure 5:
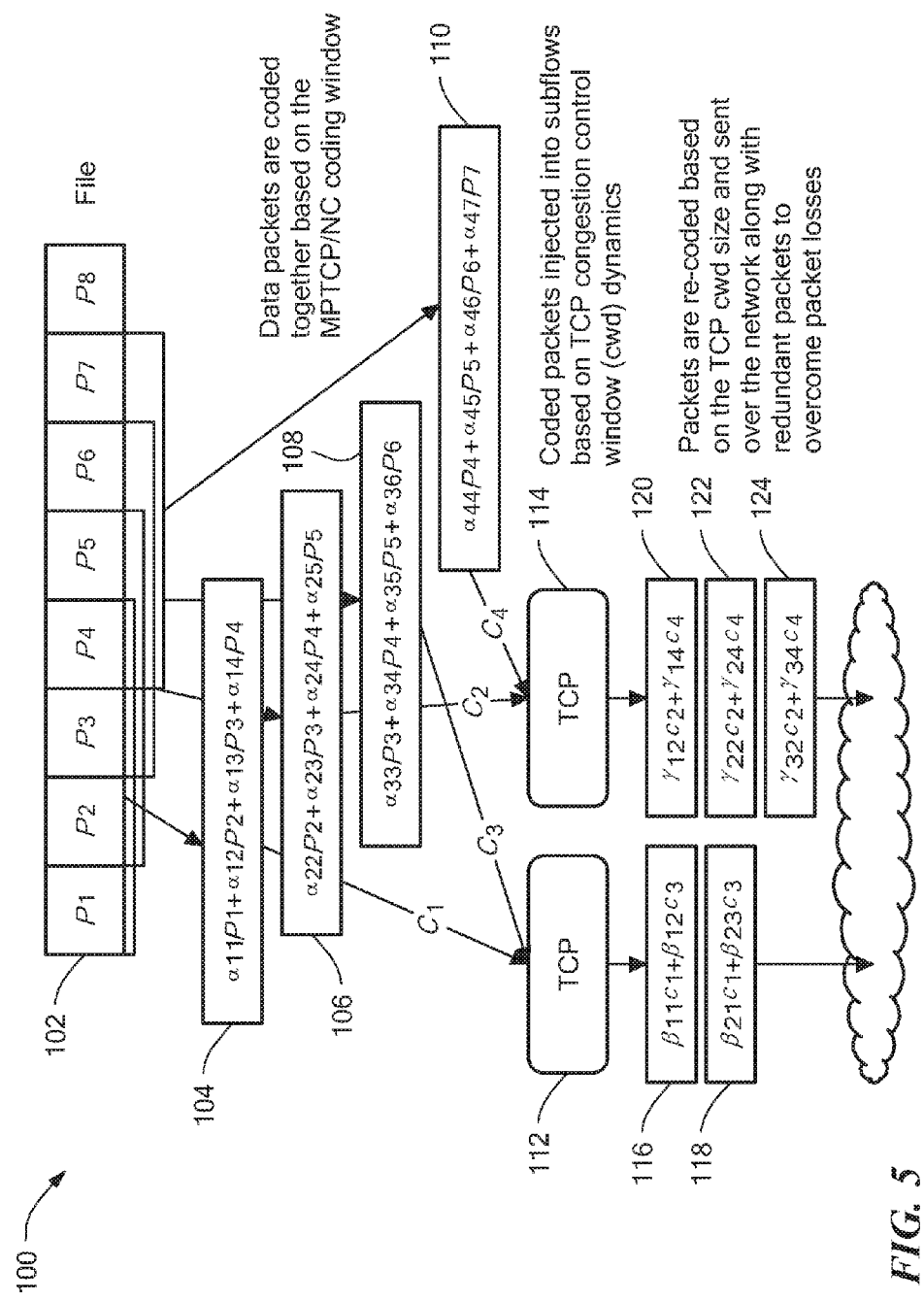
FIG. 5 is a diagram illustrating operation of an exemplary process for encoding data within a source node in accordance with an embodiment.

FIG. 5 is a diagram illustrating operation of an exemplary process 100 for encoding data within a source node in accordance with an embodiment. As shown, a data file to be transferred to a remote destination node may be comprised of (or divided into) a number of original packets 102 (i.e., $p_1$ to $p_s$). In the illustrated scenario, it is assumed that the MPTPC/NC coding window is currently four packets wide and the fast-TCP/NC coding window is 2 packets wide. As shown, the first four original packets ($p_1$-$p_4$) may first be shifted into the MPTPC/NC coding window and used to generate a coded packet 104 ($c_1$) by forming a linear combination using randomly generated coefficients. As shown, it may be decided to inject $c_1$ into a first sub-flow 112 (based on, for example, TCP congestion control window dynamics or some other criterion). A new original packet $p_5$ may then be shifted into the coding window, thus pushing the first original packet $p_1$ out of the window. A next coded packet 106 ($c_2$) may then be generated. It may be decided to inject $c_2$ into a second sub-flow 114. A similar process may then be used to generate a coded packet 108 ($c_3$) and coded packet 110 ($c_4$). As shown, it may be decided to inject coded packet $c_3$ into first sub-flow 112 and coded packet $c_4$ into second sub-flow 114.

Within the first sub-flow 112, a number of redundant coded packets 116, 118 may be generated using coded packet $c_1$ and coded packet $c_3$ (and randomly generated coefficients). The redundant packets are generated to overcome potential packet losses in transit. Likewise, within the second sub-flow 114, a number of redundant coded packets 120, 122, 124 may be generated using coded packet $c_2$ and coded packet $c_4$ (and randomly generated coefficients). Once generated, the coded packets 116, 118, 120, 122, 124 may be transmitted to a remote destination node via corresponding network media. It should be noted that the number of redundant coded packets generated within first sub-flow 112 does not have to be the same as the number generated within second sub-flow 114 (although it could be the same in some scenarios).

Figure 6:
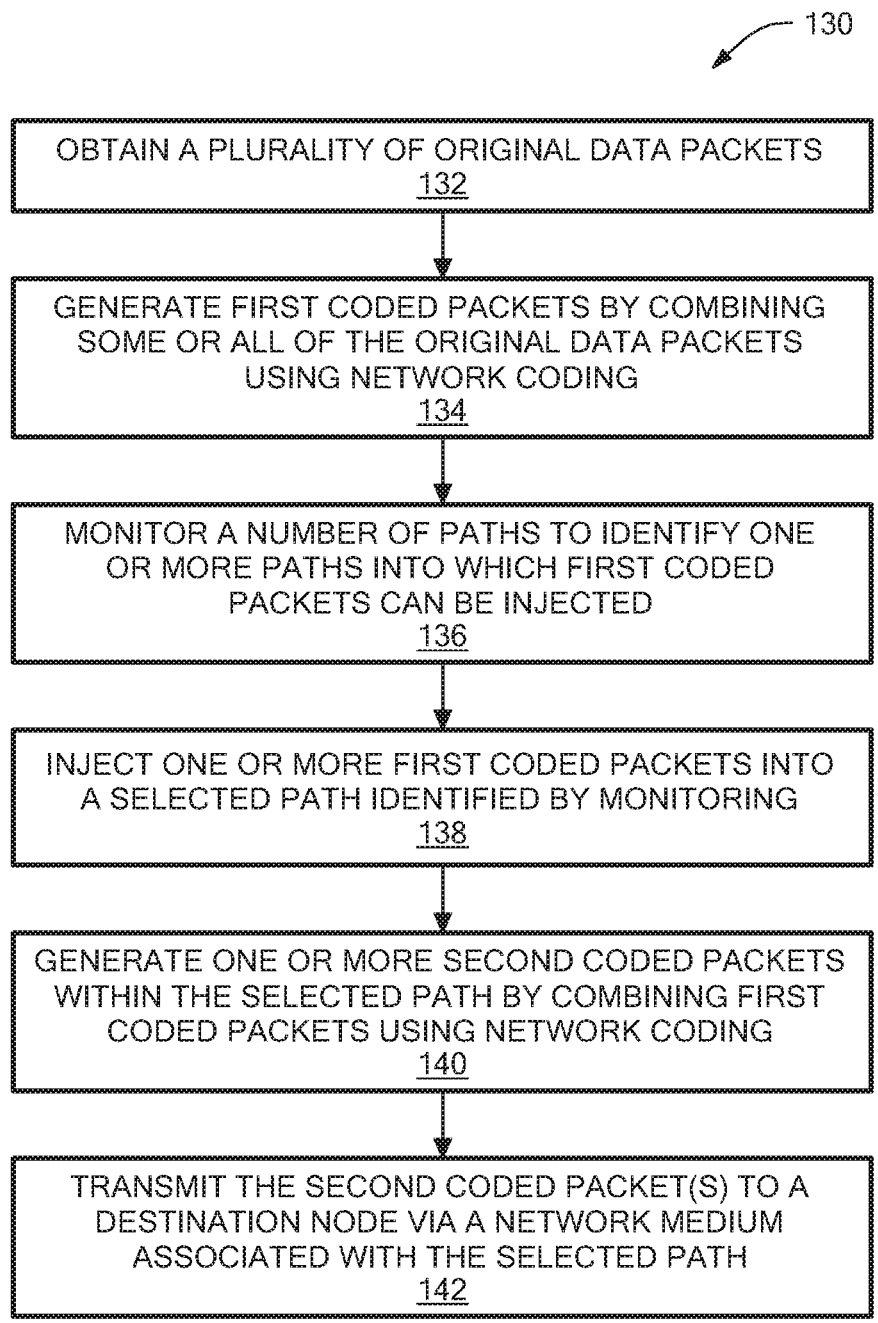
FIG. 6 is a flowchart illustrating an exemplary method for use in transmitting data from a source node to a destination node via multiple different paths in accordance with an embodiment.

FIG. 6 is a flowchart illustrating a method 130 for use in transmitting data from a source node to a destination node via multiple different paths (or sub-flows) in accordance with an embodiment. As described previously, the multiple different paths may be associated with different communication technologies in some implementations to form a heterogeneous networking arrangement. First, a number of original data packets may be obtained that are representative of the data to be transferred (step 132). For example, the data to be transferred may comprise a large data file and the original data packets may be generated by splitting up the file into smaller components. In some embodiments, the division of a larger file into original packets may be performed in an application layer or an MPTCP/NC layer of an underlying protocol. First coded data packets may then be generated by combining some or all of the original data packets using network coding (block 134). In some implementations, a first coding window (e.g., a MPTCP/NC coding window, as described previously) may be used to generate the first coded packets. The first coding window may have a particular packet width (e.g., four packets wide, etc.) and a first coded packet may be generated by forming a linear combination of the original packets currently within the first coding window, using randomly generated coefficients. A random number generator (or similar functionality)

may be used to generate the random coefficients. As each new original packet is added to the first coding window, an oldest original packet in the window may be shifted out. A new first coded packet may be generated for each new original packet added to the first coding window in some implementations. The size of the first coding window may be fixed or variable.

The multiple different paths may be monitored to identify one or more paths that can receive a new first coded packet at a particular point in time (136). This monitoring process may continue until all of the desired data has been successfully transferred to and decoded at the destination node. In some embodiments, the monitoring process may be based upon the dynamics of a TCP congestion control window. When a path is identified, one or more first coded packets may be injected into the identified path (block 138). The injected packet may then be added to a second coding window (e.g., a Fast TCP/NC coding window, etc.) associated with the identified path. Over time, different first coded packets may be injected into different paths using the above-described technique. For each path, one or more second coded packets may be generated by linearly combining the first coded packets that currently reside within a corresponding second coding window using network coding (block 140). Randomly generated coefficients may be used to perform the linear combination, as described above.

In some implementations, a number of redundant second coded packets may be generated for each set of first coded packets within the second coding window associated with a particular path. As before, for each new first coded packet added to a second coding window, an older first coded packet may be shifted out of the window. A new set of redundant packets may be generated for each new first coded packet added to a second coding window in some implementations. The redundant packets may be transmitted to the destination node via a corresponding network medium after they have been generated (block 142). The process of generating second coded packets within each path may be ongoing until all of the desired data has been successfully transferred to, and decoded at, the destination node. As described previously, the generation of second coded packets using first coded packets may mask any sequence numbers added to the first coded packets by corresponding TCP functionality.

Figure 7A:
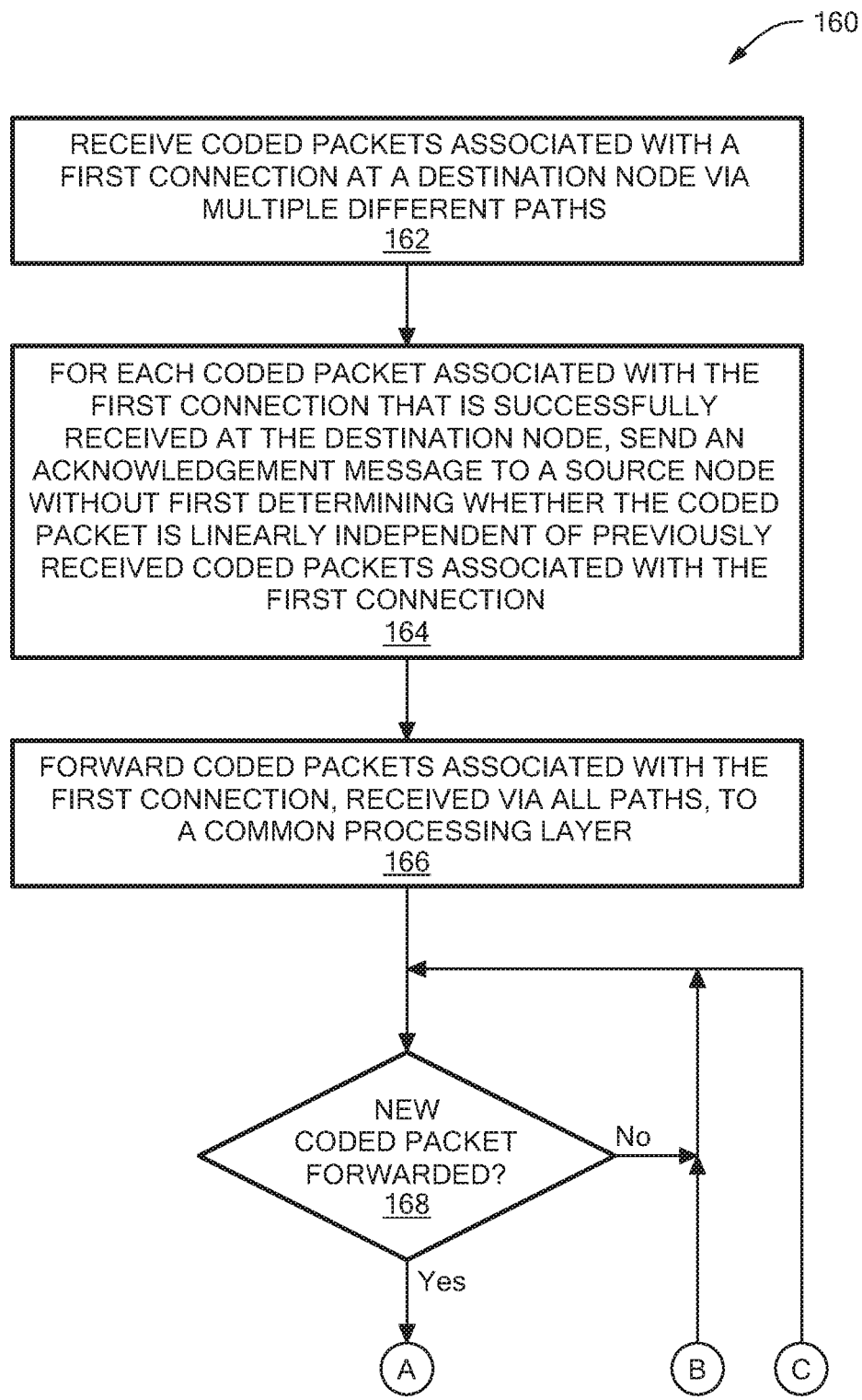
FIGS. 7a and 7b are portions of a flowchart illustrating a method for use in processing coded packets received at a destination node via multiple different paths in accordance with an embodiment.
Figure 7B:
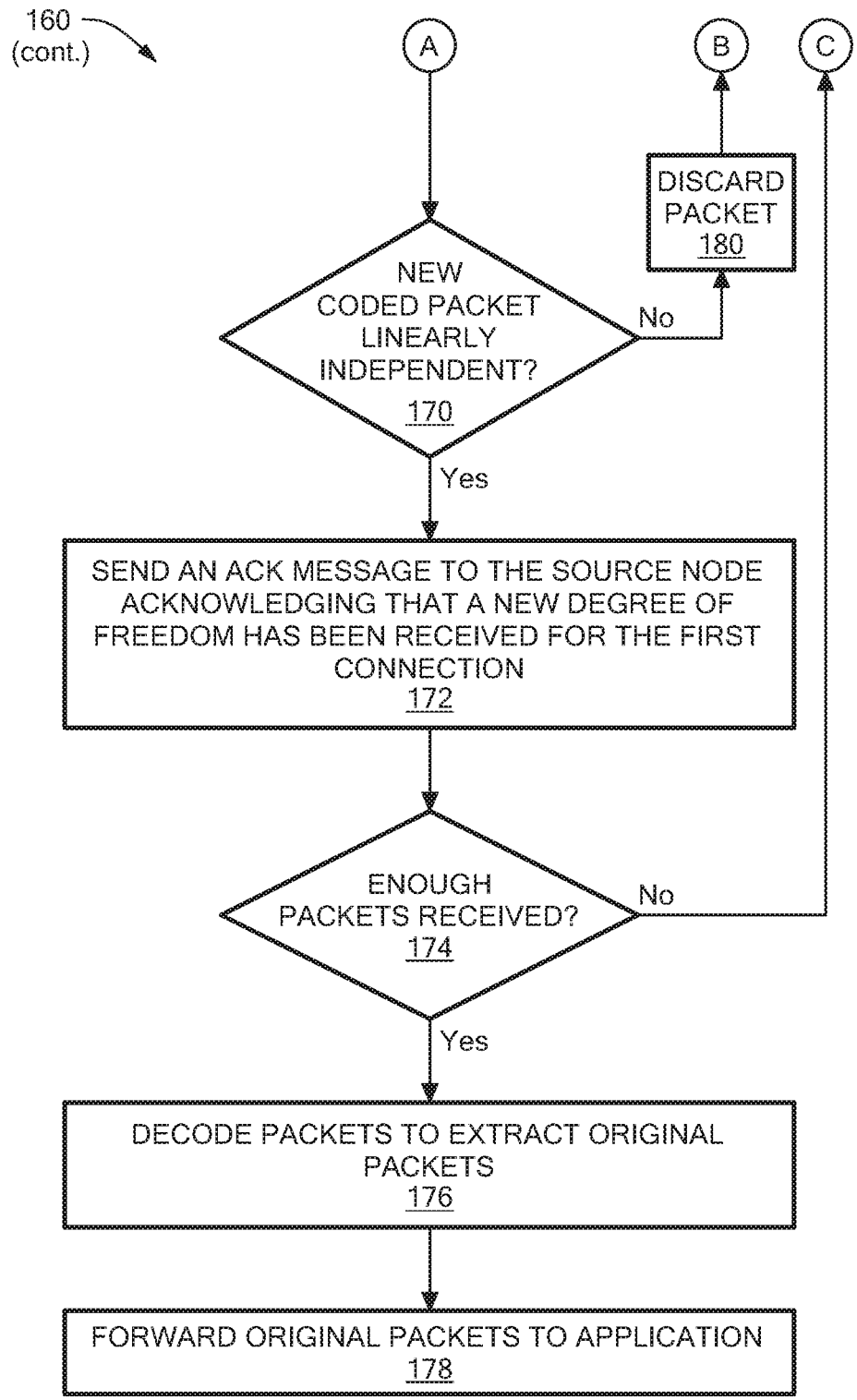

FIGS. 7a and 7b are portions of a flowchart illustrating a method 160 for use in processing coded packets received at a destination node from a source node via multiple different paths in accordance with an embodiment. The method 160 may be used, for example, to process second coded packets generated in a source node using method 130 of FIG. 6 or a similar method. Referring now to FIG. 7a, coded packets that are associated with a first connection (or a first data transfer operation) are received at a destination node via multiple different paths (block 162). For each coded packet successfully received, an acknowledgement (ACK) message may be sent to the source node acknowledging the receipt of the packet (block 164). The ACK message may be sent without first determining whether the coded packet is linearly independent of previously received coded packets associated with the first connection. All coded packets associated with the first connection that are received via all active paths may be forwarded to a common processing layer (e.g., an MPTCP/NC layer or other layer common to all paths, etc.) (block 166). The common processing layer may watch for newly forwarded coded packets associated with the first connection (block 168).

Referring now to FIG. 7b, when a new coded packet has been forwarded to the common processing layer, it may next be determined whether the new coded packet is linearly independent of previously received coded packets associated with the first connection (block 170). To determine whether the new packet is linearly independent, a Gaussian-Jordan elimination operation (or similar process) may be performed on a coefficient matrix associated with previously received packets. If the packet is not linearly independent (block 170-N), the packet may be discarded (block 180) and the common processing layer may proceed to look for a new coded packet (block 168). If the packet is linearly independent (block 170-Y), then the common processing layer may send an ACK message (e.g., DATA_ACK, etc.) to the source node indicating that a new degree of freedom has been received for the first connection (block 172). The source node may use these degree of freedom related ACK messages to, for example, modify a coding window size within the source node.

After the ACK message has been transmitted, it may next be determined whether enough linearly independent coded packets have been successfully received for the first connection to be able to decode the received coded packets to extract the original packets (block 174). If enough linearly independent coded packets have not been received to allow decoding (block 174-N), the common processing layer may proceed to look for a new coded packet (block 168). If enough linearly independent packets have been received (block 174-Y), then a decoding procedure may be performed to extract the original packets from the received coded packets (block 176). The extracted original packets may then be forwarded to a corresponding application for use thereby (block 178). The above-described process may be repeated for each data transfer operation to be carried out between the source node and the destination node.

In Table 1 below, the proposed protocol is compared with some existing methods that use TCP connections for data transmission. In Table 1, the TCP/NC protocol is referring to that proposed in "Network Coding Meets TCP: Theory and Implementation," by Sundararajan et al., *Proceedings of the IEEE*, vol. 99, no. 3, pp. 490-512, March 2011.

TABLE 1

| TCP | TCP/NC | MPTCP | MPTCP/NC |
| --- | --- | --- | --- |
| One TCP per connection | One TCP per connection | Multiple TCP per connection | Multiple TCP per connection |
| Split a file or a stream offline into different parts, one for each TCP flow | Split a file offline into different parts, one for each TCP flow | Online and dynamically split file based on sub-flow TCP window evolutions | Online and dynamically assign coded packets to TCP sub-flows |
| Each part treated as a separate file transmission | Coding occurs within each flow for disjoint parts | Original data packets assigned to sub-flows | |

An analytical model will now be presented to evaluate the performance of MPTCP/NC. The model will use several key elements presented in previous sections to provide some of the relevant abstractions. First, the model will assume that the MPTCP/NC layer provides a method that eliminates the need to track specific packets sent over a sub-flow. Because degrees of freedom are delivered to a sub-flow, rather than individual uncoded packets, the analysis presented will only need to track each degree of freedom through the network. Second, the model will assume that the congestion control algorithm used is similar to that of TCP Reno. For example, the congestion window increases by the number of received acknowledgements divided by the current window size, decreases by half upon receipt of a triple-duplicate acknowledgement, and completely closes if no acknowledgement is received after a given time-out period. Third, the model will assume that the network coding operations performed by the Fast-TCP/NC layer eliminate the need to consider the effects of triple-duplicates on TCP's window size. Instead, network coding simplifies the analysis. Since each received acknowledgement is an indication of a degree of freedom obtained by the receiver, only the effects of coded packet losses need to be considered. As a result, packet losses are interpreted as an increase in the round-trip time (RTT) between the source and destination. Finally, the concept of sending redundant coded packets will be used. For every packet contained in the TCP contention window, R linearly independent packets will be transmitted. This added redundancy significantly reduces the probability of a time-out and it will be assumed that R is large enough to reduce the probability of a time-out to zero. Each of the above abstractions contributes to the ability to analyze the performance of MPTCP/NC.

MPTCP/NC will be analyzed below using two metrics, the average throughput T and the expected MPTCP/NC congestion window evolution E[W]. Since the instantaneous throughput of TCP is directly related to $\mathbb{E}[W]$, the analysis will focus on finding $\mathbb{E}[W]$ and then take an average of $\mathbb{E}[W]$ over time to find $\mathcal{T}$. MPTCP/NC's behavior will be modeled in terms of rounds. Within a round i, MPTCP/NC's expected congestion window size $W_i$ will be determined, which is defined as the sum of each sub-flow's congestion window size $W_i^{(j)}$ for sub-flows j={1,2}:

$$W_i = \sum_j W_i^{(j)} = W_i^{(1)} + W_i^{(2)}. \quad (1)$$

Figure 8:
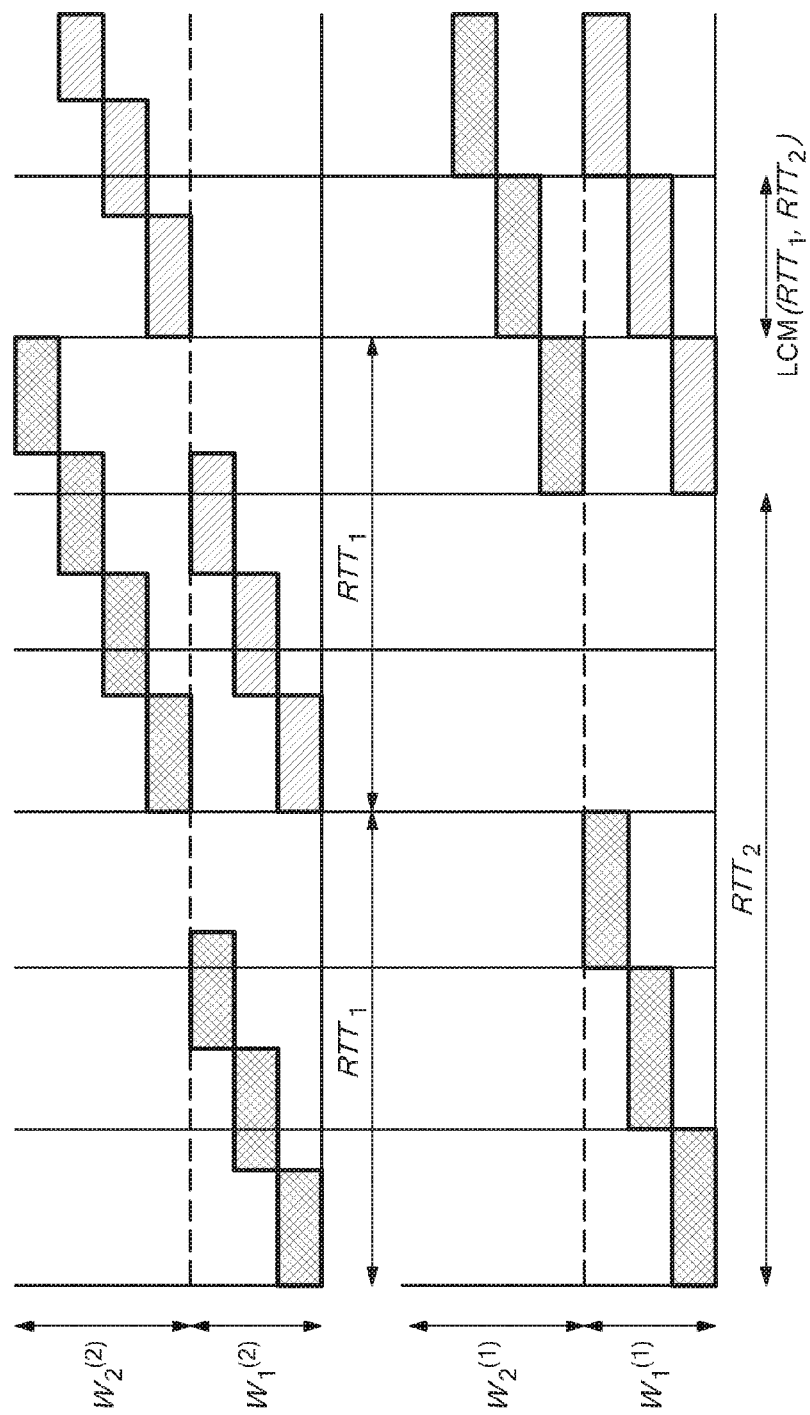
FIG. 8 is a diagram illustrating a round duration approach used for analyzing operation of an MPTCP/NC protocol.

The natural choice for determining the duration of a round is to use the round trip time (RTT) from the sender to the receiver (i.e., duration(i)=RTT), where equation (1) assumes that $RTT_1=RTT_2$. While this may work if there is a single TCP connection, each sub-flow in MPTCP/NC will typically have different round trip times making it difficult to determine which RTT to use. In order to account for this, the duration of each round will be set equal to the least common multiple (LCM) of the RTT for sub-flow 1 and sub-flow 2 (i.e., duration(i)=LCM($RTT_1$, $RTT_2$)). FIG. 8 provides an illustration of this concept. The TCP congestion window size will now need to be determined for each sub-flow, given the duration of a round. This may be done by defining α and β as follows:

$$\alpha := \frac{RTT_1}{LCM(RTT_1, RTT_2)} \text{ and } \beta := \frac{RTT_2}{LCM(RTT_1, RTT_2)}. \quad (2)$$

The window size for sub-flow j in round i is then $W_{\lceil ik \rceil}^{(j)}$ for k={α, β}. Equation (1) now becomes:

$$W_i = W_{\lceil i\alpha \rceil}^{(1)} + W_{\lceil i\beta \rceil}^{(2)}. \quad (3)$$

The expected TCP congestion window size will now be analyzed for each sub-flow. The results will then be extended so that MPTCP/NC's end-to-end throughput can be determined. The analysis for the jth sub-flow in MPTCP/NC will be the same for each sub-flow. The most basic implementation of TCP will be used in the analysis and initially it will be assumed that each round's duration is equal to the RTT of sub-flow j. It will also be assumed that the window size during round i is determined by the number of acknowledgements a obtained during round i−1. Specifically, the window size on each round is:

$$W_i^{(j)} = W_{i-1}^{(j)} + \frac{a_{i-1}^{(j)}}{W_{i-1}^{(j)}}. \quad (4)$$

Assuming that $R_j$ linearly independent packets are sent for each packet contained the TCP congestion window and a packet loss rate of $p_j$, the expectation of the window size, $\mathbb{E}[W_i^{(j)}]$, may be expressed as:

$$\mathbb{E}[W_i^{(j)}] = \mathbb{E}\left[W_{i-1}^{(j)} + \frac{a_{i-1}^{(j)}}{W_{i-1}^{(j)}}\right] \quad (5)$$

$$= \mathbb{E}[W_{i-1}^{(j)}] + \mathbb{E}\left[\frac{a_{i-1}^{(j)}}{W_{i-1}^{(j)}}\right] \quad (6)$$

$$= \mathbb{E}[W_{i-1}^{(j)}] + \mathbb{E}\left[\mathbb{E}\left[\frac{a_{i-1}^{(j)}}{W_{i-1}^{(j)}} \mid W_{i-1}^{(j)}\right]\right] \quad (7)$$

$$= \mathbb{E}[W_{i-1}^{(j)}] + \mathbb{E}\left[\frac{1}{W_{i-1}^{(j)}}\mathbb{E}[a_{i-1}^{(j)} \mid W_{i-1}^{(j)}]\right] \quad (8)$$

$$= \mathbb{E}[W_{i-1}^{(j)}] + \mathbb{E}\left[\frac{1}{W_{i-1}^{(j)}}((1-p_j)R_j W_{i-1}^{(j)})\right] \quad (9)$$

$$= \mathbb{E}[W_{i-1}^{(j)}] + (1-p_j)R_j. \quad (10)$$

Since the window size of TCP can increase by a maximum of one packet per round, $$\mathbb{E}[W_i^{(j)}] = \mathbb{E}[W_{i-1}^{(j)}] + \min(1, (1-p_j)R_j) \quad (11)$$

$$= \mathbb{E}[W_1^{(j)}] + (i-1)\min(1, (1-p_j)R_j) \quad (12)$$

where equation (12) is obtained by iterating equation (11).

Now that the expected window size in round i has been found, the throughput $\mathcal{T}_i^{(j)}$ during the round can be calculated as follows:

$$\mathcal{T}_i^{(j)} = \frac{\mathbb{E}[W_{i-1}^{(j)}]}{RTT_j}\min(1, (1-p_j)R_j), \quad (13)$$

where the minimization is necessary to account for packets that are received that do not deliver new degrees of freedom. Since the Fast-TCP/NC layer codes all packets within the TCP congestion window, delivered packets 1 through $W_i^{(j)}$ contain new degrees of freedom. If more than $W_i^{(j)}$ packets are received in the round, the MPTCP/NC layer will disregard them since they obtain no new degrees of freedom. Therefore, the throughput is adjusted to ensure that only new degrees of freedom are taken into account.

The fact that the round duration is not equal to sub-flow j's RTT (i.e., the duration of a round is equal to the $LCM(RTT_1, RTT_2)$) will now be taken into account. The expected window size in equation (12) can be adjusted to account for the shorter rounds by substituting $\lceil l\gamma \rceil$ for i, where l is the round number when using the shorter round duration and $\gamma = \{\alpha, \beta\}$:

$$\mathbb{E}[W_{\lceil l/\gamma \rceil}^{(j)}] = \mathbb{E}[W_1^{(j)}] + (\lceil l/\gamma \rceil - 1)\min(1, (1-p_j)R_j). \quad (14)$$

Substituting the above equation into equation (13), the per-round throughput for a TCP sub-flow j is obtained as follows:

$$\mathcal{T}_l^{(j)} = \frac{1}{\gamma} \gamma \mathcal{T}_{\lceil l\gamma \rceil}^{(j)} \quad (15)$$

$$= \frac{1}{\gamma \cdot RTT_j}\left(\mathbb{E}[W_1^{(j)}] + \left(\left\lceil \frac{l}{\gamma}\right\rceil - 1\right)\min(1, (1-p_j)R_j)\right)\min(1, (1-p_j)R_j). \quad (16)$$

This equation can be reduced if a large enough redundancy factor $R_j$ is considered. As will be demonstrated later, the value chosen for $R_j$ can be critical in achieving the maximum throughput. If it is assumed that the network capacity between the source and the destination is larger than the maximum window size $W_{max}^{(j)} \times R_j$ for values of $$R_j > \frac{1}{1-p_j},$$

then equation (16) becomes, $$\mathcal{T}_l^{(j)} = \frac{1}{\gamma \cdot RTT_j}\left(\mathbb{E}[W_1^{(j)}] + \left(\left\lceil \frac{l}{\gamma}\right\rceil - 1\right)\right). \quad (17)$$

Finally, the fact that the window size of a TCP connection is limited by a maximum value $W_{max}^{(j)}$ needs to be addressed. This changes the expected window size during round l to be the minimum of equation (14) and $W_{max}^{(j)}$. Furthermore, the per-round throughput becomes:

$$\mathcal{T}_l^{(j)} = \frac{1}{\gamma \cdot RTT_j}\left(\min\left(W_{max}^{(j)}, \mathbb{E}[W_1^{(j)}] + \left(\left\lceil \frac{l}{\gamma}\right\rceil - 1\right)\right)\right). \quad (18)$$

The model used in the above analysis of MPTCP/NC sub-flow performance makes several assumptions that, in practice, should be considered. First, it is assumed that packet losses are independent and identically distributed (i.i.d.) with loss probability $p_i$. When the network is not congested and none of the links experience outages, this assumption is valid; but it fails when packet losses are correlated. A possible extension to the analysis presented here is to take correlated packet losses into account by modeling them using Gilbert-Elliot model. Second, it is assumed that the number of redundant packets $R_j$ sent for every packet contained in the TCP congestion window was sufficiently large to ignore the possibility of a time-out, which would close the TCP window to $\mathbb{E}[W_1^{(j)}]$. When $R_j = 1/(1-p_j)$, this assumption is not necessarily valid. As will be shown in subsequent sections, time-outs occur frequently with i.i.d. packet losses when $R_j = 1/(1-p_j)$. Specifically, a time-out occurs when the sum of received acknowledgements over two rounds, i and i+1, is less than the window size during round i with probability $\mathcal{P}r(a_i + a_{i+1} < W_i)$. One possible direction is to model time-outs as a random walk with a threshold crossing (although time-outs are not included in the present analysis).

Third, it is assumed that $RTT_j$ remains constant. In practice, this is not true. Implementations of TCP generally use an averaged round-trip time often referred to as the "smoothed" round-trip time SRTT. Because network coding masks i.i.d. packet losses by extending the duration of RTT and network congestion or transmission delay is not taken into account, the RTT used in our analysis is effectively equal to SRTT.

It is desirable to determine average end-to-end throughput for MPTCP/NC. As shown above, the throughput for TCP/NC is dependent on the TCP congestion window size. Likewise, the average MPTCP/NC throughput is dependent on the joint window size of all sub-flows (i.e., $W_i = \Sigma_j W_i^{(j)}$). While the approach shown here can be used for any number of TCP/NC sub-flows, results will only be provided for two sub-flows designated as sub-flow 1 and sub-flow 2 with packet loss probabilities and round-trip times of $p_1$, $RTT_1$ and $p_2$, $RTT_2$, respectively.

Using the least common multiple of $RTT_1$ and $RTT_2$ as the duration of each round and the values of $\alpha$ and $\beta$ defined in (2), the expected congestion window size for MPTCP/NC is:

$$\mathbb{E}[W_i] = \mathbb{E}\left[W_{\lceil \frac{i}{\alpha} \rceil}^{(1)} + W_{\lceil \frac{i}{\beta} \rceil}^{(2)}\right] \quad (19)$$

$$= \mathbb{E}\left[W_{\lceil \frac{i}{\alpha} \rceil}^{(1)}\right] + \mathbb{E}\left[W_{\lceil \frac{i}{\beta} \rceil}^{(2)}\right] = \mathbb{E}[W_1^{(1)}] + \left(\left\lceil \frac{i}{\alpha}\right\rceil - 1\right)\min(1, (1-p_1)R_1) \quad (20)$$

$$+ \mathbb{E}[W_1^{(2)}] + \left(\left\lceil \frac{i}{\beta}\right\rceil - 1\right)\min(1, (1-p_2)R_2). \quad (21)$$

One thing that was not taken into account is the maximum window size of each TCP/NC sub-flow. Incorporating the maximum window size of sub-flow 1, $W_{max}^{(1)}$, and sub-flow 2, $W_{max}^{(2)}$, the expected MPTCP/NC window size becomes:

$$\mathbb{E}[W_i] = \max\left(W_{max}^{(1)}, \mathbb{E}[W_1^{(1)}] + \left(\left\lceil \frac{i}{\alpha}\right\rceil - 1\right)\min(1, (1-p_1)R_1)\right) + \quad (22)$$

$$\max\left(\mathbb{E}[W_1^{(2)}] + \left(\left\lceil \frac{i}{\beta}\right\rceil - 1\right)\min(1, (1-p_2)R_2)\right).$$

The equation above shows that the expected MPTCP/NC window size is monotonically increasing. As a result, it would be desirable to determine how fast it increases. This may be investigated by finding the number of rounds $\mathcal{R}_W$ it takes to get to a window size of W. The intuition behind finding the expected number of rounds it will take to reach a window size of W is that each sub-flow is geometrically distributed. Letting $0 \leq x \leq W$:

$$\mathbb{E}[\mathcal{R}_W] = \mathbb{E}[\mathcal{R}_W^{(1)}] + \mathbb{E}[\mathcal{R}_W^{(2)}] \quad (23)$$

$$= \frac{\alpha}{1-p_1}\sum_{i=1}^{W_x^{(1)}-1} i + \frac{\beta}{1-p_2}\sum_{i=1}^{W_{W-x}^{(2)}-1} i \quad (24)$$

$$= \frac{\alpha(W_x^{(1)}(W_x^{(1)}-1))}{2(1-p_1)} + \frac{\beta(W_{W-x}^{(2)}(W_{W-x}^{(2)}-1))}{2(1-p_2)} \quad (25)$$

Now that the expected MPTCP/NC congestion window size has been determined, the average end-to-end throughput for MPTCP/NC may be found, which is a function of the above window size:

$$\mathcal{T} = \frac{1}{n} \sum_{i=1}^{n} \mathcal{T}_i \qquad (26)$$

$$= \frac{1}{n} \sum_{i=1}^{n} (\mathcal{T}_i^{(1)} + \mathcal{T}_i^{(2)}) \qquad (27)$$

$$= \frac{1}{n \cdot \alpha \cdot RTT_1} \sum_{i=1}^{n} \mathbb{E}\left[W_{\lceil \frac{i}{\alpha} \rceil}^{(1)}\right] + \frac{1}{n \cdot \beta \cdot RTT_2} \sum_{i=1}^{n} \mathbb{E}\left[W_{\lceil \frac{i}{\beta} \rceil}^{(2)}\right] \qquad (28)$$

Assuming that $n\alpha, n\beta \in \mathbb{Z}$, $$\mathcal{T} = \frac{1}{n \cdot RTT_1} \sum_{i=1}^{n\alpha} \mathbb{E}[W_i^{(1)}] + \frac{1}{n \cdot RTT_2} \sum_{i=1}^{n\beta} \mathbb{E}[W_i^{(2)}] = \qquad (29)$$

$$\frac{1}{n \cdot RTT_1} \left( \frac{n}{\alpha} \mathbb{E}[W_1^{(1)}] + \frac{n\alpha(n\alpha-1)}{2} \min(1, (1-p_1)R_1) \right)$$

$$+ \frac{1}{n \cdot RTT_2} \left( \frac{n}{\beta} \mathbb{E}[W_1^{(2)}] + \frac{n\beta(n\beta-1)}{2} \min(1, (1-p_2)R_2) \right) = \qquad (30)$$

$$\frac{1}{n \cdot \alpha \cdot RTT_1} \left( n \mathbb{E}[W_1^{(1)}] + \frac{n(n-\alpha)}{2\alpha} \min(1, (1-p_1)R_1) \right)$$

$$+ \frac{1}{n \cdot \beta \cdot RTT_2} \left( n \mathbb{E}[W_1^{(2)}] + \frac{n(n-\beta)}{2\beta} \min(1, (1-p_2)R_2) \right). \qquad (31)$$

If $n\alpha, n\beta \notin \mathbb{Z}$, the above equation will contain additional terms that contain packets sent in the rounds from $\lfloor n\gamma \rfloor$ to $n\gamma$ for $\gamma = \{\alpha, \beta\}$. While these additional packets increase the throughput, their contribution is negligible for large enough n. Finally, the maximum window size of each sub-flow $W_{max}^{(j)}$ is considered. First, let:

$$r^{(1)} = \alpha(W_{max}^{(1)} - \mathbb{E}[W_1^{(1)}]) \text{ and } r^{(2)} =$$
$$\beta(W_{max}^{(2)} - \mathbb{E}[W_1^{(2)}]). \qquad (32)$$

Using equation (31) and assuming that $R_1 > 1/(1-p_1)$ and $R_2 > 1/(1-p_2)$, four cases for the average end-to-end throughput are generated:

$$\mathcal{T} = \begin{cases} \frac{1}{n \cdot \alpha \cdot RTT_1} \left( n\mathbb{E}[W_1^{(1)}] + \frac{n(n-\alpha)}{2\alpha} \right) \\ + \frac{1}{n \cdot \beta \cdot RTT_2} \left( n\mathbb{E}[W_1^{(2)}] + \frac{n(n-\beta)}{2\beta} \right) & \text{for } n \leq r^{(1)}, r^{(2)}, \\ \frac{1}{n \cdot \alpha \cdot RTT_1} \left( n\mathbb{E}[W_1^{(1)}] + \frac{n(n-\alpha)}{2\alpha} \right) \\ + \frac{1}{n \cdot \beta \cdot RTT_2} \left( r^{(2)}\mathbb{E}[W_1^{(2)}] + \frac{r^{(2)}(r^{(2)}-\beta)}{2\beta} + W_{max}^{(2)}(n - r^{(2)}) \right) & \text{for } r^{(2)} < n \leq r^{(1)}, \\ \frac{1}{n \cdot \alpha \cdot RTT_1} \left( r^{(1)}\mathbb{E}[W_1^{(1)}] + \frac{r^{(1)}(r^{(1)}-\beta)}{2\alpha} + W_{max}^{(1)}(n - r^{(1)}) \right) \\ + \frac{1}{n \cdot \beta \cdot RTT_2} \left( n\mathbb{E}[W_1^{(2)}] + \frac{n(n-\beta)}{2\beta} \right) & \text{for } r^{(1)} < n \leq r^{(2)}, \\ \frac{1}{n \cdot \alpha \cdot RTT_1} \left( r^{(1)}\mathbb{E}[W_1^{(1)}] + \frac{r^{(1)}(r^{(1)}-\beta)}{2\alpha} + W_{max}^{(1)}(n - r^{(1)}) \right) \\ + \frac{1}{n \cdot \beta \cdot RTT_2} \left( r^{(2)}\mathbb{E}[W_1^{(2)}] + \frac{r^{(2)}(r^{(2)}-\beta)}{2\beta} + W_{max}^{(2)}(n - r^{(2)}) \right) & \text{for } r^{(1)}, r^{(2)} < n. \end{cases} \qquad (33)$$

An analysis has thus been provided to determine the sub-flow performance and overall MPTCP/NC performance using the expected window size W and the end-to-end average throughput T as metrics. As noted above, results were provided for two sub-flows; but network coding makes it possible to use the same technique for any number of sub-flows. In the analysis, assumptions were made regarding the congestion control algorithm, time-outs and the amount of redundancy introduced into the network to account for packet losses. In the discussion that follows, numerical results are provided which show that the amount of redundancy is critical in eliminating time-outs.

The performance of the proposed MPTCP/NC scheme was analyzed through numerical simulations. As part of the analysis, the same two-link model used in the mathematical analysis was considered, where the packet losses on a given link are i.i.d. with probability $p_i$, $i=1,2$ and fixed throughout the use of the channel. In addition, the losses are independent between links, packets are not received out of order, the round trip time on each link is fixed and acknowledgments are not lost. This proposed model is suitable for a wireless scenario where congestion is not a major factor for packet losses.

In the simulations, TCP is restricted to operate in two modes: slow start and congestion avoidance. The slow start threshold (SST) for each TCP window is 64 packets, and the window can have a maximum size of $W_{max}=128$ packets. A timeout is declared by TCP when a packet is not acknowledged (remains in the window) for two round trip times. When a timeout occurs, the window is reset to one. Furthermore, the window size is reduced to half when a triple duplicate ACK is received. Note that this never occurs in MPTCP/NC, since every received package is acknowledged. In addition, it is assumed that the transmitter sends a file of a given (fixed) size, to which it has access before transmission starts.

Three MPTCP schemes were considered:
(1) Uncoded MPTCP: this is traditional MPTCP operation where packets are dynamically allocated to a given TCP subflow when requested.
(2) MPTCP/NC with low redundancy: MPTCP/NC operation is modeled with redundancy on each link equal to $R_i = (1-p_i)^{-1}$, $i=1,2$, as discussed in the mathematical analysis above. It is assumed that the entire transmitted file is coded.
(3) MPTCP/NC with high redundancy: MPTCP/NC is modeled with redundancy 5% above the average loss, i.e., $R_i = 1.05(1-p_i)^{-1}$, $i=1,2$.

Figure 9:
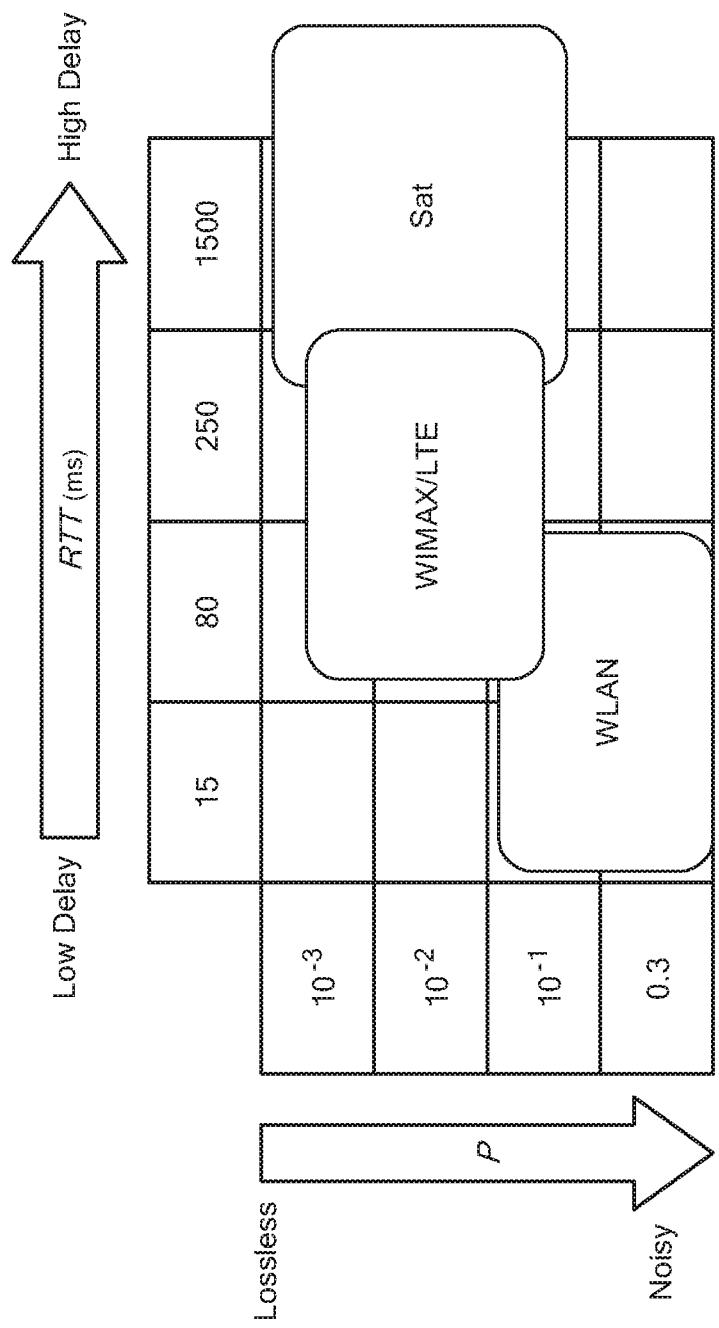
FIG. 9 is a diagram illustrating round trip time and packet loss probability parameters for several different wireless standards.

Three parameters were measured for each of these schemes considering different file sizes, packet loss probabilities and round trip times: (i) completion time, (ii)

average rate, and (iii) total window size (i.e., sum of the windows of the two TCP subflows). The round trip time and packet loss probability parameters are shown in FIG. 9, together with a correspondence between the parameters and different wireless standards.

The simulated model has several limitations. For example, it assumed that each link always supports up to 128 packets being transmitted simultaneously, regardless of the round trip time and link capacity. As mentioned previously, this model also does not consider losses due to congestion or lost acknowledgments. Furthermore, the assumption that the MPTCP/NC layer has access to the whole file being transmitted is unrealistic for several different applications, such as video streaming. Nevertheless, as will be shown in the following analysis, this model does capture some of the fundamental characteristics of MPTCP/NC's operation, clearly illustrating the benefits of coding over two TCP flows in regards using uncoded MPTCP.

In the discussion that follows, numerical results are provided for four different simulated scenarios, each with different values of RTT and link loss probability. The average results presented were taken over a set of 1000 different simulation instances done in MATLAB.

In the first scenario, the upper left hand side corner of the table in FIG. 3 is considered, modeling one link as very reliable and with low delay, with parameters $RTT_1=15$ ms, $p_1=10^{-3}$, and the other link as slightly worse, but still reliable with average delay, with parameters $RTT_2=80$ ms and $p_2=10^{-2}$. The goal is to illustrate the performance and window size in a scenario with small loss rate and low round trip times. Out of all the scenarios considered, this is the one that achieves the highest transmission rates.

Figure 10A:
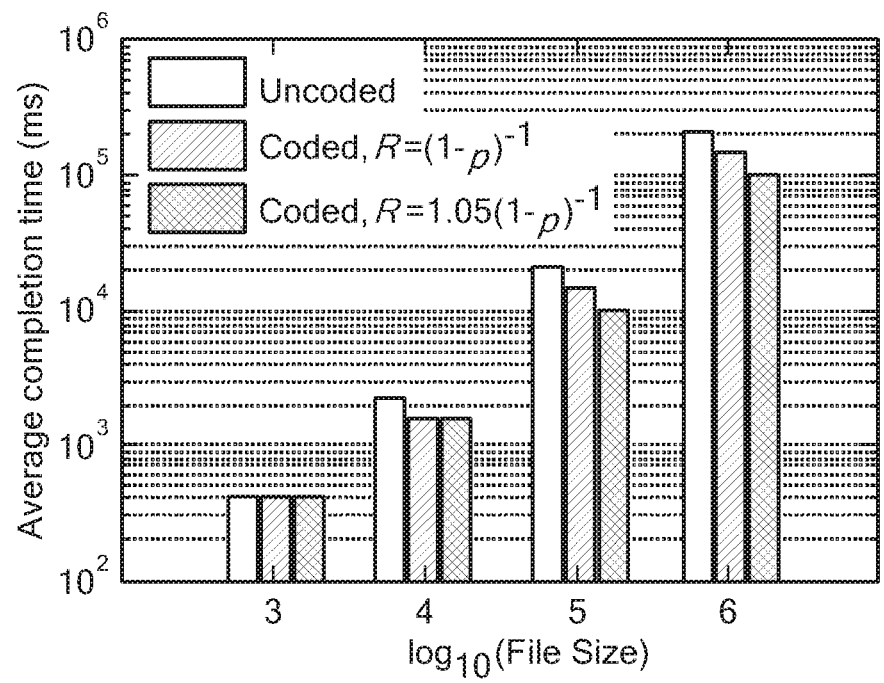
FIGS. 10a-10c are diagrams illustrating analysis results for three considered models using two sub-flows having parameters $RTT_1=15$ ms, $p_1=10^{-3}$, $RTT_2=80$ ms, and $p_2=10^{-2}$.
Figure 10B:
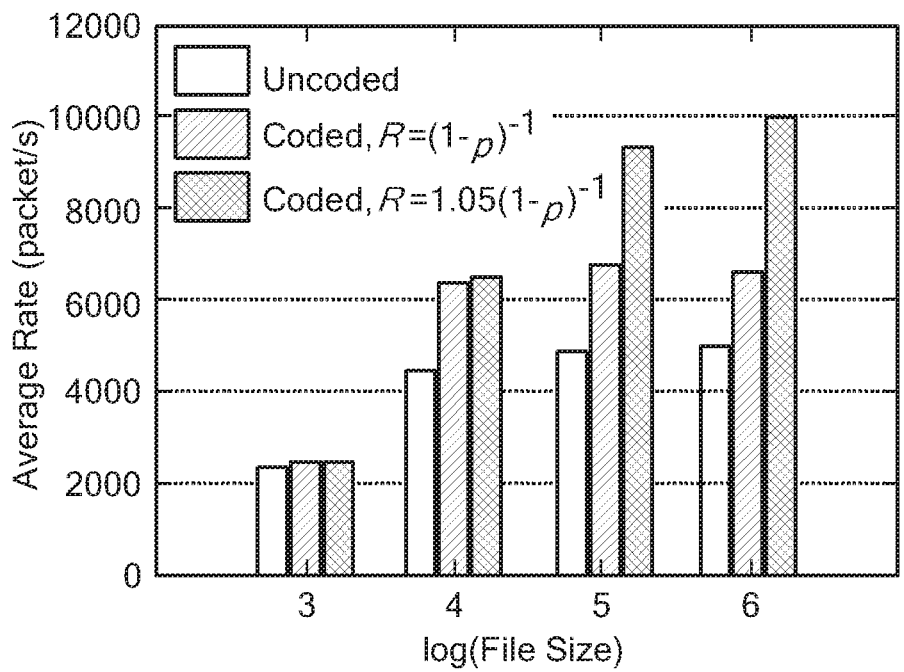

The average completion time and average rate for different file sizes are illustrated in FIGS. 10a and 10b. For this scenario, the average rate of uncoded MPTCP is considerably lower than the coded cases. In addition, the extra 5% redundancy introduced by MPTCP/NC also significantly increases the rate. Notice also that the average rate with MPTCP/NC with 5% extra redundancy increases with file size. This is due to the fact that each TCP subflow rarely times out in this low loss scenario, with the window staying at its maximum size during virtually all of the transmission time after it achieves its maximum value. The effect of time out events is more noticeable in the uncoded case and in MPTCP/NC with just average redundancy, with the average rate achieving its maximum size at files of size $10^5$ packets. On the other hand, for the case with coding and extra redundancy, the rate steadily increases with file size.

Figure 10C:
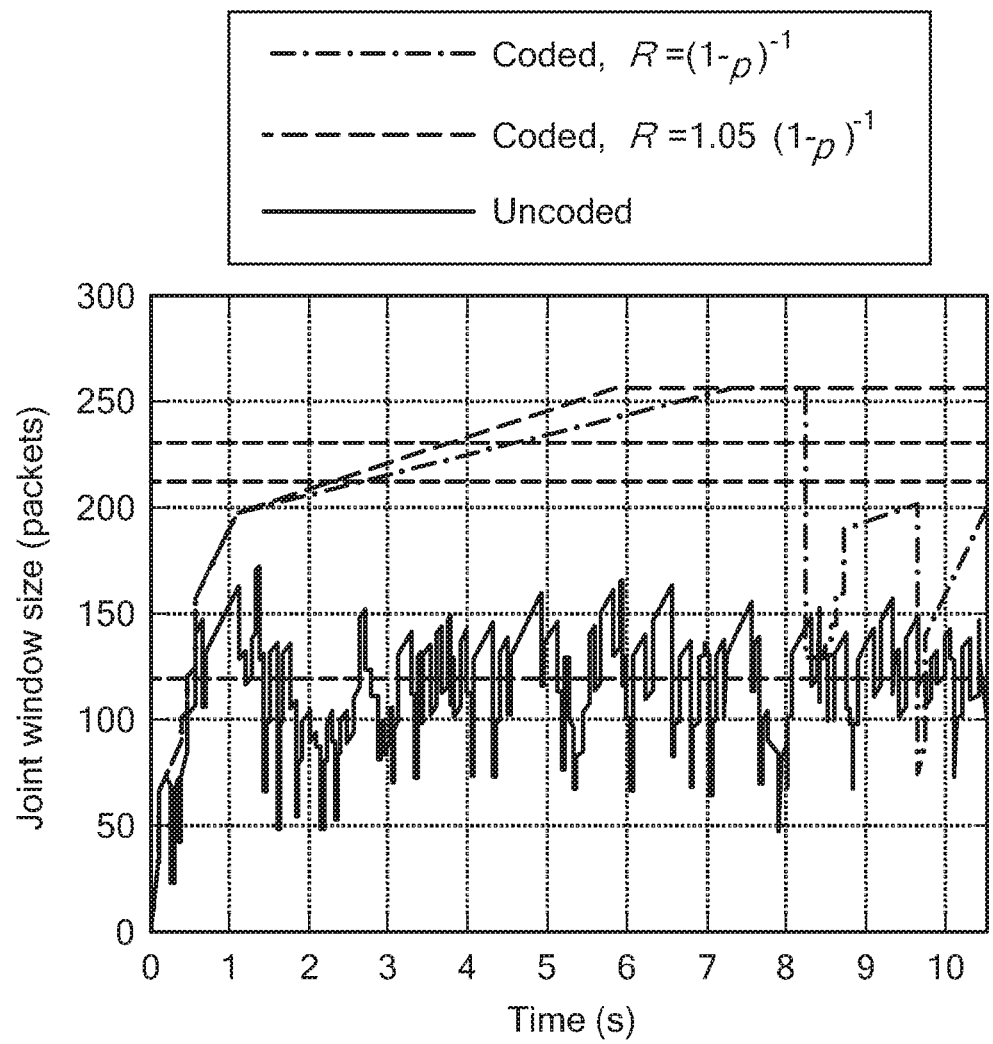

The behavior of each of the three schemes can be better understood by FIG. 10c. Here "snapshots" of the joint window size are presented for specific instances of the initial operation of each scheme together with the averages calculated over different simulations of the channel, considering a file size of $10^5$ packets. Observe that the extra 5% redundancy has two key contributions to MPTCP/NC: (i) the window size achieves its maximum value before the case where we use MPTCP/NC with average redundancy and (ii) each TCP subflow suffers less time outs. The first contribution follows naturally from the fact that extra redundancy increases the number of acknowledgments received from the Fast-TCP/NC layer. The second point stems from the fact that, for the proposed MPTCP/NC scheme, time out events have an extremely low probability of occurring. When an additional 5% redundancy is added, these events become even rarer, with a time out not being observed in this particular instance.

Even for this low loss scenario, uncoded MPTCP/NC performs poorly, with the joint window size never achieving the maximum value. Notice how for this particular instance uncoded TCP quickly "averages out", already varying over its average joint window size after only the first second of transmission time.

Figure 11A:
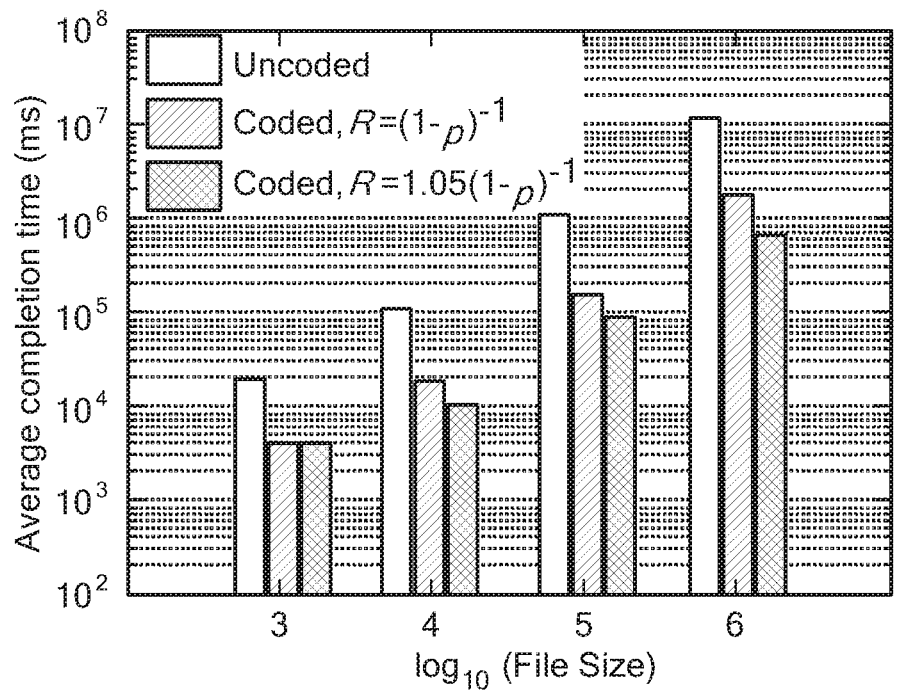
FIGS. 11a-11c are diagrams illustrating analysis results for three considered models using two sub-flows having parameters $RTT_1=1500$ ms, $p_1=10^{-2}$, $RTT_2=80$ ms, and $p_2=10^{-1}$.
Figure 11B:
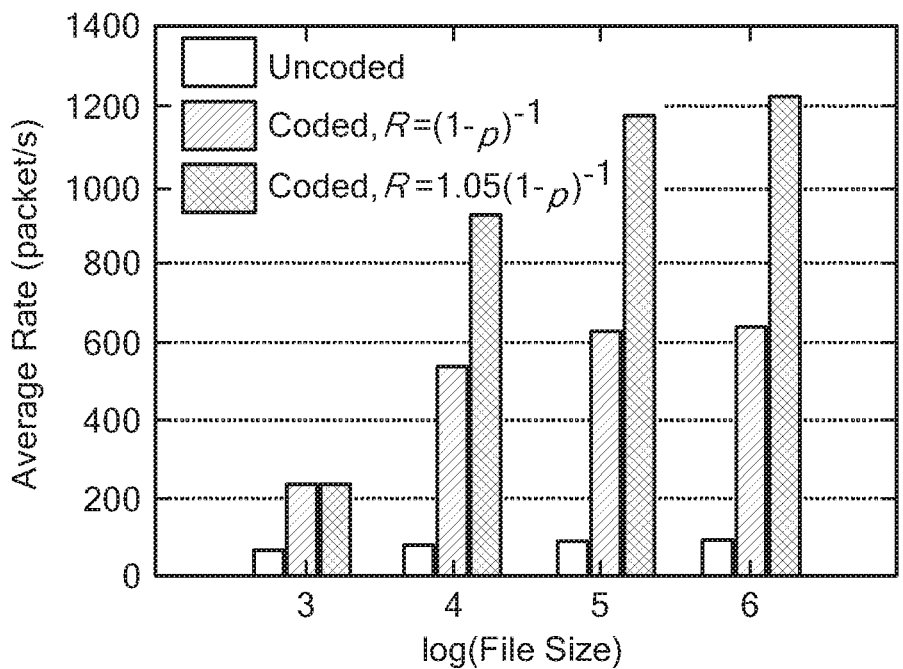
Figure 11C:
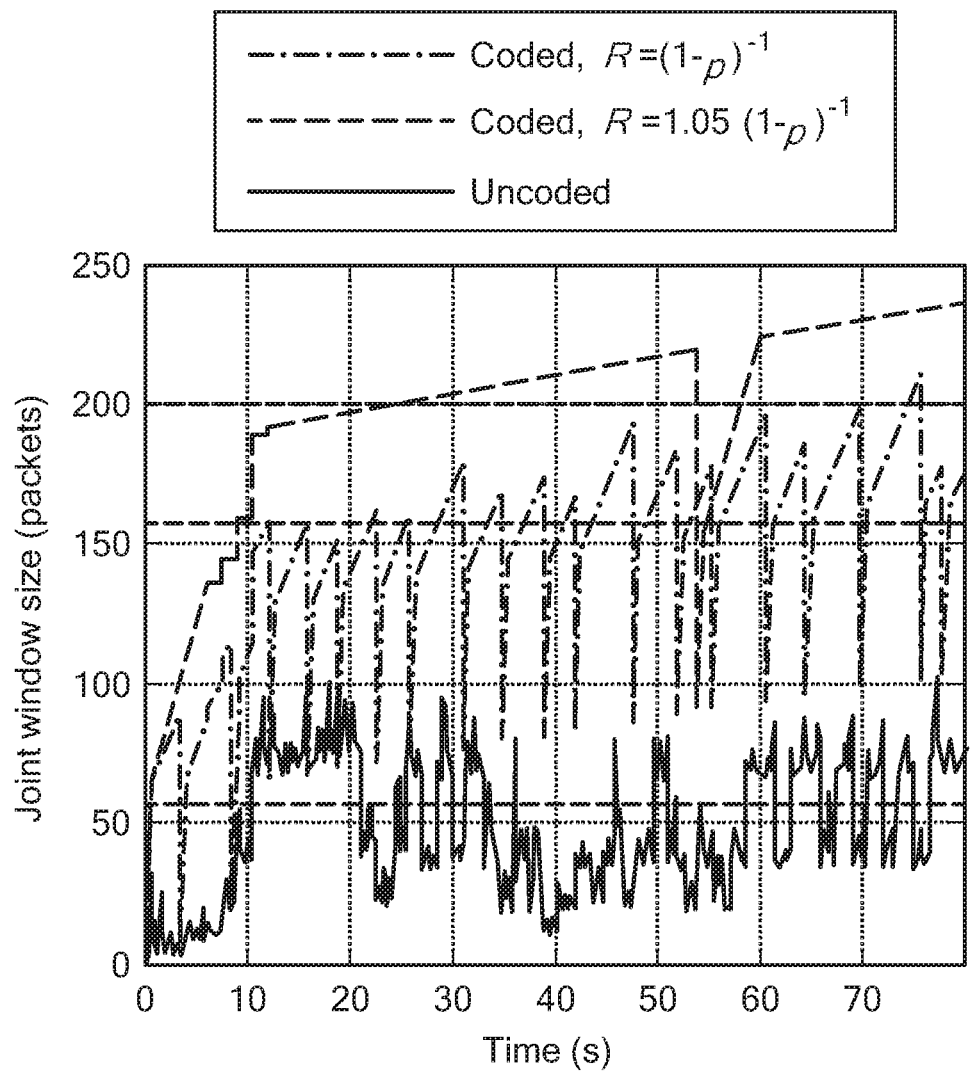

The second considered scenario is more realistic, with one link representing, for example, a WiMax connection, with $RTT_2=80$ ms and $p_2=10^{-1}$, and the second link having a high round trip time and low packet loss probability, given by $RTT_2=80$ ms and $p_2=10^{-1}$. The second link could represent, for example, a satellite connection. Similarly to case 1, FIGS. 11a and 11b present the average completion time and average rate for different file sizes, and FIG. 11c depicts specific instances of the joint window size for each of the considered transmission schemes.

The advantage of MPTCP/NC over uncoded MPTCP becomes clear in this scenario, with an average rate increase of over 10× for the investigated file sizes. In the uncoded MPTCP scheme, the link with low RTT is underutilized due to the high number of losses. This can be seen by the small variations of the line corresponding to uncoded MPTCP in FIG. 11c. As a consequence, the window size is mostly determined by the slow link which, due to the high round trip time, increases slowly.

On the other hand, MPTCP/NC is able to compensate for the packet loss rate in the link with low RTT through coding. When adding redundancy according to the average packet loss probability, time outs still occur periodically in the faster, less reliable link, as can be observed in the lowest curve in FIG. 11c. However, the corresponding Fast-TCP/NC subflow is still able to quickly recover from the time out events.

When an additional 5% redundancy is added, time out events become very rare in the low RTT link. Consequently, this link is fully utilized, with the corresponding TCP subflow achieving its maximal window during the beginning of the transmission. Time out events still occur, as shown in FIG. 11c, but the spacing between time outs increases significantly, and Fast-TCP/NC manages to quickly recover from these events. As a result, the increase of the joint window size is determined by the link with high RTT, and slowly grows towards its maximum value.

Figure 12A:
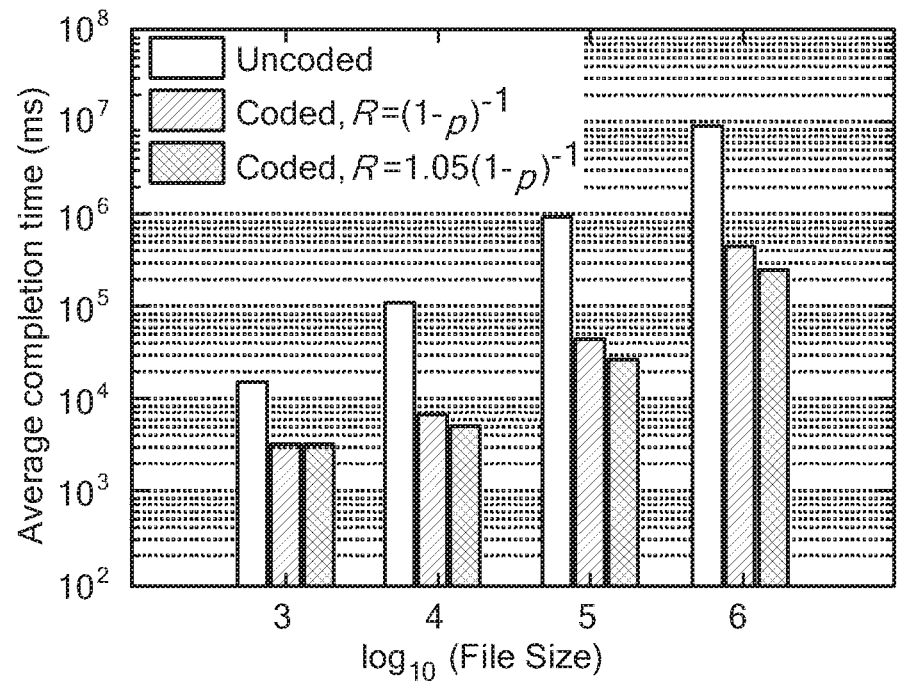
FIGS. 12a-12c are diagrams illustrating analysis results for three considered models using two sub-flows having parameters $RTT_1=1500$ ms, $p_1=10^{-3}$, $RTT_2=15$ ms, and $p_2=0.3$.
Figure 12B:
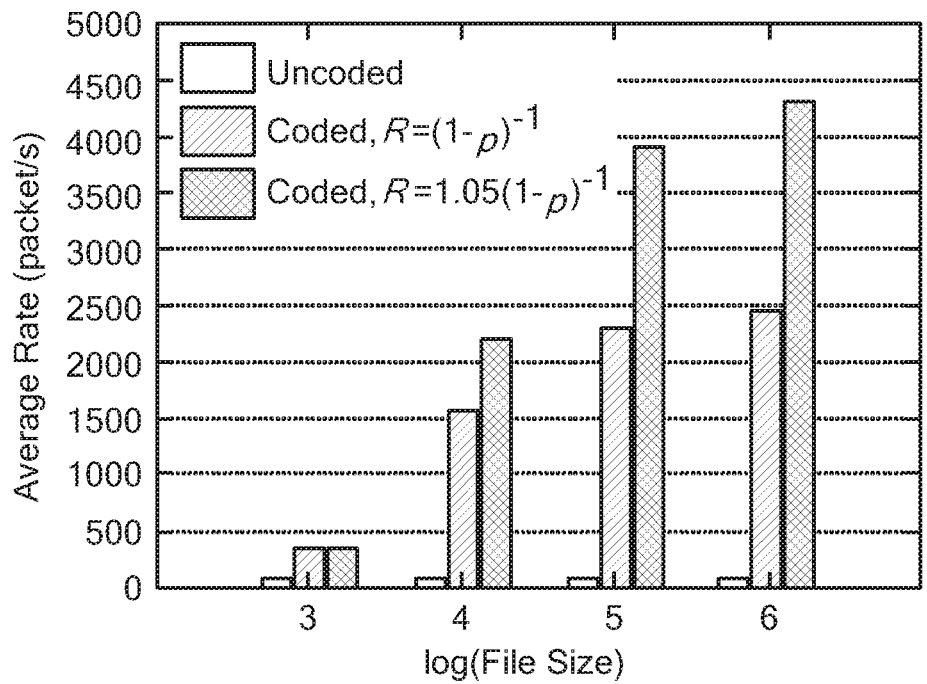
Figure 12C:
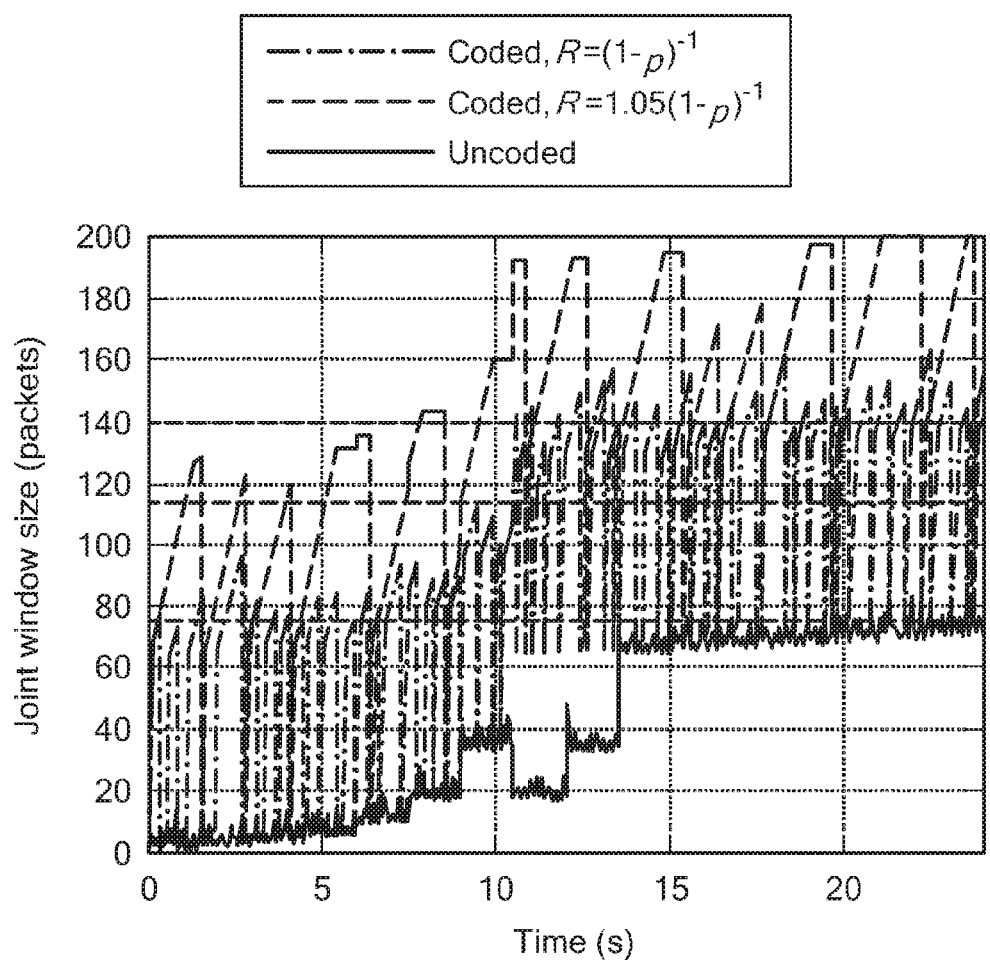

In the previous case, it was shown how uncoded MPTCP/NC tends to rely on the link with the lowest packet loss probability, regardless of the round trip time. In order to make this phenomena even more apparent, a third case will now be considered where one link is very reliable but with a very long round trip time, with $RTT_1=1500$ ms and $p_1=10^{-3}$, and the second link has a low round trip time (100 times smaller) but is very unreliable, with $RTT_2=15$ ms and $p_2=0.3$. This corresponds to two opposite extreme points of FIG. 9. The corresponding results are illustrated in FIGS. 12a, 12b, and 12c.

The average rate obtained by MPTCP/NC with 5% extra redundancy is nearly two orders of magnitude larger than uncoded MPTCP. The dependence of MPTCP on the slower link becomes obvious in FIG. 12c, with the fast unreliable link corresponding to variations in the joint window size of only a few packets, and the coarse changes due to the link with high RTT. Observe also that, for a file of size $10^5$ packets, after over 25 seconds of transmission the joint window size of uncoded MPTCP is still approximating its final average values, whereas the MPTCP/NC has already concluded transmission.

Once again it is noted that MPTCP/NC manages to reduce the number of time outs with coding. In addition, when a time out occurs, it is able to quickly recover due to the Fast-TCP/NC mechanism. As noted previously, the extra 5% redundancy also contributes significantly towards less timeouts, resulting in a significantly larger throughput in this noise scenario.

Figure 13A:
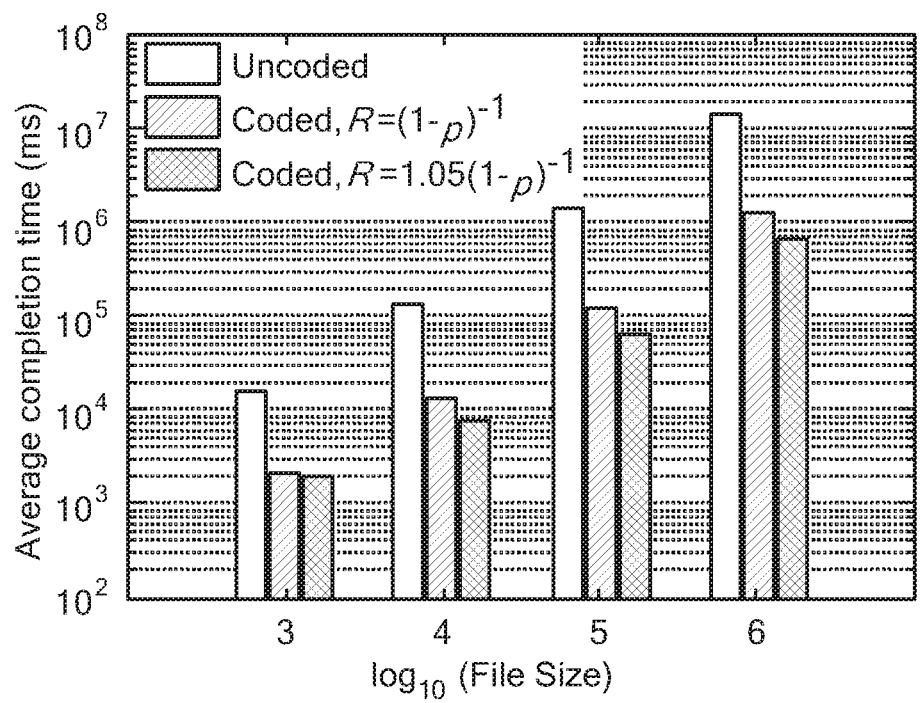
FIGS. 13a-13c are diagrams illustrating analysis results for three considered models using two sub-flows having parameters $RTT_1=80$ ms, $p_1=10^{-1}$, $RTT_2=250$ ms, and $p_2=10^{-1}$.
Figure 13B:
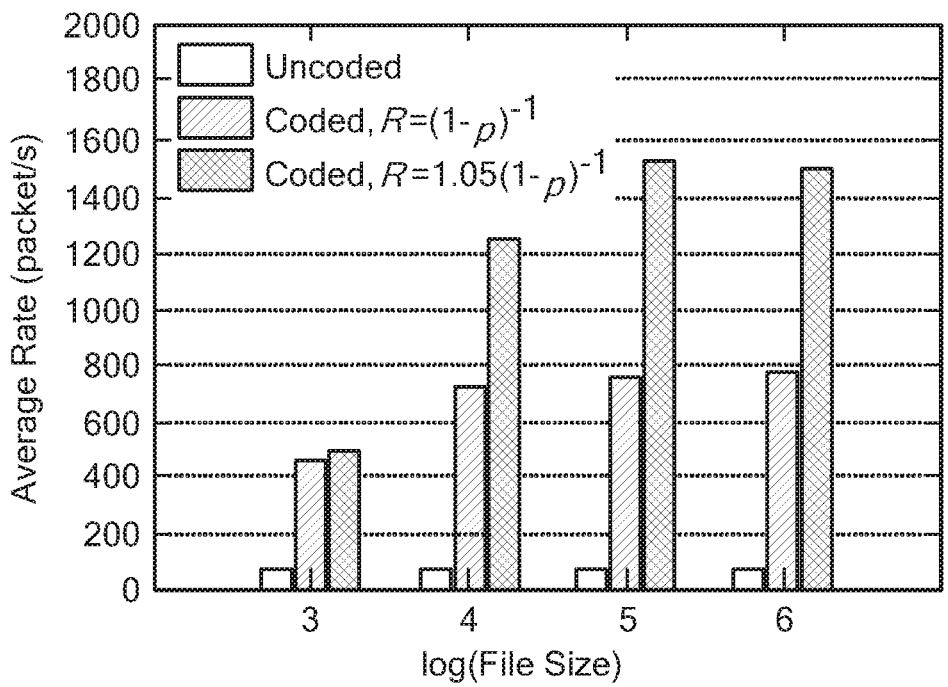
Figure 13C:
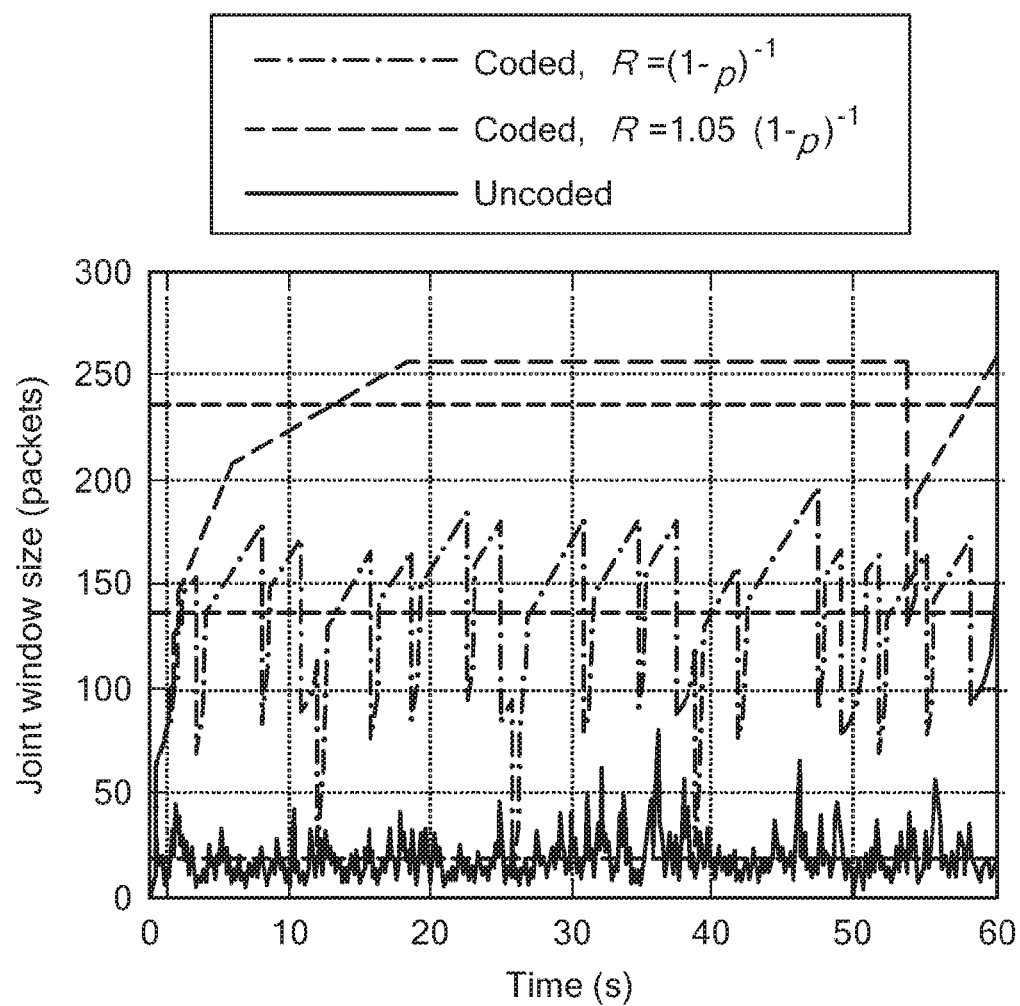

In the final scenario, both links are assumed to have the same error probability and different but comparable round trip times, with $RTT_1=80$ ms, $p_1=10^{-1}$, $RTT_2=250$ ms and $p_2=10^{-1}$. This scenario could represent, for example, a 3G and a WiFi link in parallel. The results for this case are depicted in FIGS. 13a, 13b, and 13c.

Due to the high packet loss probability in both links, the MPTCP scheme quickly "averages out", and does not manage to increase significantly the joint window size of the TCP sub-flows. Furthermore, for large file sizes, adding 5% redundancy to MPTCP/NC above the average throughput of the channel almost doubles the achievable average rate. As discussed previously, this is due to the fact that the extra redundancy makes time out events very rare, and a joint time out for the two links will almost never occur for most file sizes. On the other hand, when $R=(1-p)^{-1}$, time outs happen more frequently and can occur jointly for both links, reducing the window size to only a few packets. Nevertheless, even in this case, the Fast-TCP/NC layer manages to quickly increase the joint window size.

Based on the above analyses, it is apparent that MPTCP/NC can provide an average transmission rate that is an order of magnitude or more better than MPTCP in different cases of interest. Some conclusions that may be drawn include: (a) a little redundancy in MPTCP/NC can be very helpful, reducing time outs (by≈2× average rate in some noisy scenarios); (b) MPTCP performs poorly when compared to the coded case, even with low error probabilities; (c) MPTCP's performance is determined by the link with lower packet loss, nearly independent of RTT; (d) using coding masks packet losses as higher RTTs, as expected; and (e) MPTCP/NC is effective in leveraging links with significantly different RTTs.

Figure 14:
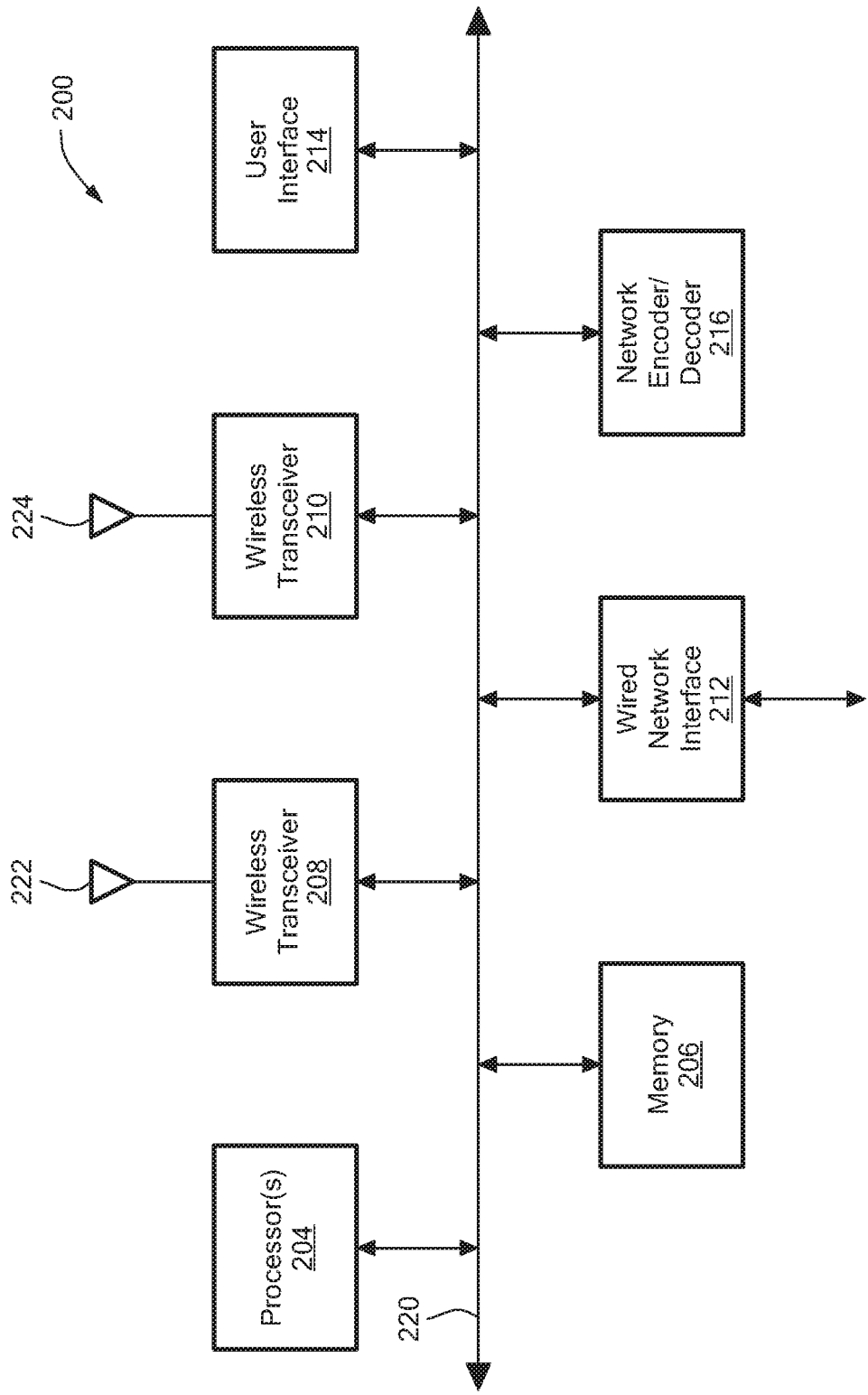
FIG. 14 is a block diagram illustrating an exemplary node device architecture that may be used in a node device incorporating features described in the present disclosure in one or more embodiments.

FIG. 14 is a block diagram illustrating an exemplary node device architecture 200 that may be used in a node device that incorporates features described in the present disclosure in one or more implementations. As illustrated, the node device architecture 200 may include: one or more digital processors 204, memory 206, a first wireless transceiver 206, a second wireless transceiver 210, a wired network interface 212, a user interface 214, and a network encoder/decoder 216. A bus 220 and/or other structure(s) may be provided for establishing interconnections between various components of device architecture 200. Digital processor(s) 204 may include one or more digital processing devices that are capable of executing programs or procedures to provide functions and/or services for a user. Memory 206 may include one or more digital data storage systems, devices, and/or components that may be used to store data and/or programs for other elements of node device architecture 200. User interface 214 may include any type of device, component, or subsystem for providing an interface between a user and a corresponding node device. First and second wireless transceivers 208, 210 may include any type of transceivers that are capable of supporting wireless communication with one or more remote wireless entities. Wired network interface 212 may include any type of transceiver that is capable of supporting wired communication with one or more external communication entities.

Digital processor(s) 204 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), and/or other processing devices or systems, including combinations of the above. Digital processor(s) 204 may be used to, for example, execute an operating system for a corresponding node device. Digital processor(s) 204 may also be used to, for example, execute one or more application programs for a node device. In addition, digital processor(s) 204 may be used to implement, either partially or fully, one or more of the communications related processes or techniques described herein in some implementations.

As described above, first and second wireless transceivers 208, 210 may include any type of transceivers that are capable of supporting wireless communication with one or more remote wireless entities. In various implementations, these transceivers 208, 210 may be configured in accordance with one or more wireless standards (e.g., wireless networking standards, wireless cellular standards, etc.) for use in communicating with corresponding wireless networks, systems, or devices. In this fashion, these transceivers may be used to support heterogeneous communication as described above. Although illustrated with two wireless transceivers in FIG. 14, it should be appreciated that any number of transceivers may be used in various embodiments. In some implementations, one or both of wireless transceivers 208, 210 may be capable of communicating with peer devices in a peer-to-peer, ad-hoc, or wireless mesh network arrangement. In addition, in some implementations, one or both of wireless transceivers 208, 210 may be capable of communicating with a base station or access point of an infrastructure-type wireless communication system or network. As illustrated in FIG. 14, wireless transceivers 208, 210 may each be coupled to one or more antennas 222, 224 and/or other transducers, to facilitate the transmission and/or reception of communication signals. In some implementations, wireless transceivers 208, 210 may be used to implement or facilitate, either partially or fully, one or more of the communications related processes or techniques described herein.

Wired network interface 212 may be configured in accordance with one or more wired communication standards. Although illustrated with a single wired network interface 212, it should be appreciated that any number of wired interfaces may be used in other implementations. In some embodiments, wired network interface 212 may be used to support heterogeneous networking in conjunction with one or more other transceivers (wired or wireless).

Memory 206 may include any type of system, device, or component, or combination thereof, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data. In some embodiments, computer executable instructions may be stored in memory 206 that, if executed within a digital processor, can result in the performance of one or more of the methods described herein, or portions thereof.

Network encoder/decoder 216 may include a device or system for performing network encoding and/or decoding for a node device. In a source node device that will generate and transmit network coded packets, network encoder/decoder 216 may include network encoding functionality. Likewise, in a destination node device that will receive and decode network encoded packets, network encoder/decoder 216 may include decoding functionality. In a node that may serve as both a source node and a destination node, both network encoding and decoding functionality may be provided. It should be appreciated that, although illustrated as a separate unit, network encoder/decoder 216 may be implemented, at least partially, within another component or device of a node in some implementations (e.g., within processor(s) 204 of FIG. 14, etc.).

It should be appreciated that the node device architecture 200 of FIG. 14 represents one possible example of an architecture that may be used in an implementation. Other architectures may alternatively be used. As used herein, the terms "node device," "node," or "communication device" are used to describe any type of digital electronic device or system that includes some form of communication capability (wireless and/or wired) that can act as a source or destination of data flow. This may include, for example, a laptop, desktop, notebook, or tablet computer; a personal digital assistant (PDA); a personal communication service (PCS) device; a personal navigation assistant (PNA); a cellular telephone, smart phone, or other wireless communication device; a pager; a wireless sensor device; a satellite communication device; a media player having communication capability; a digital storage device with communication capability; an integrated circuit or multi-chip module, and/or other devices. It should be appreciated that all or part of the various devices, processes, or methods described herein may be implemented using any combination of hardware, firmware, and/or software. In some embodiments, methods described herein, or portions or variations thereof, may be implemented as computer executable instructions stored on one or more computer readable media. Any form of non-transitory computer readable media may be used in various embodiments.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine implemented method for use in at a source node for transferring data to a destination node, the method comprising:
   obtaining, from an application layer within the source node, a plurality of original data packets to be transferred to the destination node;
   generating, at the source node, first coded packets by linearly combining two or more of the original data packets using network coding;
   distributing the first coded packets among multiple available paths leading from the source node to the destination node;
   generating, at the source node, second coded packets associated with a first path of the multiple available paths by linearly combining two or more of the first coded packets distributed to the first path using network coding;
   generating, at the source node, second coded packets associated with a second path of the multiple available paths by linearly combining two or more of the first coded packets distributed to the second path using network coding;
   transmitting the second coded packets associated with the first path to the destination node via the first path; and
   transmitting the second coded packets associated with the second path to the destination node via the second path.

2. The method of claim 1, wherein:
   generating first coded packets includes generating first coded packets by linearly combining two or more of the original data packets that are within a sliding coding window.

3. The method of claim 2, further comprising:
   receiving acknowledgement messages from the destination node that each indicate that a new degree of freedom has been received by the destination node in connection with the data transfer; and
   adjusting the width of the sliding coding window based, at least in part, on received acknowledgement messages.

4. The method of claim 1, wherein:
   generating second coded packets includes generating second coded packets by linearly combining two or more of the first coded packets that are within a sliding coding window.

5. The method of claim 4, wherein:
   generating second coded packets includes generating redundant second coded packets for each set of first coded packets within the sliding coding window.

6. The method of claim 1, wherein:
   each of the multiple available paths includes a transmission control protocol (TCP) layer that adds sequence numbers to first coded packets distributed to the path, wherein generating second coded packets by linearly combining two or more of the first coded packets masks the sequence numbers added to the first coded packets associated with a path.

7. The method of claim 1, wherein:
   each of the multiple available paths includes a transmission control protocol (TCP) layer; and
   distributing the first coded packets includes distributing the first coded packets among the multiple available paths based, at least in part, on TCP congestion control window dynamics.

8. The method of claim 1, wherein:
   the multiple available paths are associated with different network technologies.

9. The method of claim 1, wherein:
   obtaining a plurality of original data packets includes receiving the original data packets from an application layer.

10. A machine implemented method for use at a destination node for processing coded packets received from a source node via multiple different paths, the method comprising:
    receiving, at the destination node, first coded packets associated with a first connection via multiple different paths, the first coded packets each including a linear combination of original data packets;
    receiving, at the destination node, second coded packets associated with a second connection via the multiple different paths, the second coded packets each including a linear combination of the first coded packets associated with the first connection via the multiple different paths;

for each first coded packet associated with the first connection that is successfully received, sending an acknowledgement message from the destination node to the source node without first determining whether the coded packet is linearly independent of previously received coded packets associated with the first connection;

forwarding all coded packets associated with the first connection, received from all paths, to a common processing layer within the destination node without decoding the coded packets;

decoding the coded packets to extract original packets; and forwarding the original packets to an application layer in the destination node.

11. The machine implemented method of claim 10 wherein for each coded packet associated with the first connection forwarded to the common processing layer:

determining whether the coded packet is linearly independent of coded packets associated with the first connection that were previously forwarded to the common processing layer; and sending an acknowledgement message from the destination node to the source node acknowledging that a new degree of freedom has been received for the first connection if the coded packet is determined to be linearly independent.

12. The method of claim 10 wherein:

receiving, at the destination node, coded packets associated with a first connection via multiple different paths includes receiving coded packets from paths that use different network technologies, wherein each of the different paths uses transmission control protocol (TCP) to control a transfer of packets through the path.

13. The method of claim 12, wherein:

sending an acknowledgement message from the destination node to the source node without first determining whether the coded packet is linearly independent of previously received coded packets is performed as part of a TCP layer.

14. The method of claim 13, wherein:

sending an acknowledgement message from the destination node to the source node without first determining whether the coded packet is linearly independent of previously received coded packets is performed within a first portion of the TCP layer for coded packets received via a first path and within a second portion of the TCP layer for coded packets received via a second path that is different from the first path.

15. The method of claim 10, wherein:

receiving, at the destination node, coded packets associated with a first connection via multiple different paths includes receiving some coded packets via a first path following a first communication standard and receiving some other coded packets via a second path following a second communication standard that is different from the first communication standard.

16. The method of claim 10, wherein:

forwarding all coded packets associated with the first connection, received from all paths, to a common processing layer within the destination node includes forwarding the coded packets to a multiple path transfer control protocol with network coding (MPTCP-NC) layer that is higher than a TCP layer in a corresponding protocol architecture.

17. The method of claim 16, wherein:

the protocol architecture includes separate protocol stacks associated with each of the multiple different paths.

18. The method of claim 11, wherein:

determining whether the coded packet is linearly independent includes performing a Gauss-Jordan elimination operation on a coefficient matrix.

19. A communication device comprising:

a first network interface unit configured for communication in a first network;

a second network interface unit configured for communication in a second network that is different from the first network; and at least one processor configured to manage data transfer between the communication device and a destination node using multiple different paths, the at least one processor configured to:

obtain, from an application layer, a plurality of original packets representative of data to be transferred to the destination node;

generate first coded packets by linearly combining two or more of the original data packets using network coding;

distribute the first coded packets to the multiple different paths to the destination node;

generate second coded packets associated with a first path of the multiple different paths by linearly combining two or more of the first coded packets distributed to the first path using network coding;

generate second coded packets associated with a second path of the multiple available paths by linearly combining two or more of the first coded packets distributed to the second path using network coding;

transmit the second coded packets associated with the first path to the destination node via the first network using the first network interface unit; and transmit the second coded packets associated with the second path to the destination node via the second network using the second network interface unit.

20. The communication device of claim 19, wherein the at least one processor is configured to generate first coded packets by linearly combining two or more of the original data packets within a sliding coding window.

21. The communication device of claim 19, wherein the at least one processor is configured to generate second coded packets for a first path by linearly combining first coded packets within a sliding coding window.

22. The communication device of claim 21, wherein the at least one processor is configured to generate redundant second coded packets for the first path for each set of first coded packets within the sliding coding window.

23. The communication device of claim 19, wherein the at least one processor is configured to distribute the first coded packets to the multiple different paths based, at least in part, on TCP congestion control window dynamics.

24. The communication device of claim 19, further comprising:

at least one additional network interface unit configured for communication within at least one additional network.

25. A communication device comprising:

a first network interface unit configured for communication in a first network;

a second network interface unit configured for communication in a second network that is different from the first network; and at least one processor configured to manage processing of coded data packets received from a source node via multiple different paths as part of a first connection, first coded packets associated with a first connection via multiple different paths, the first coded packets each including a linear combination of original data packets; and at least one processor configured to manage processing of coded data packets received from a source node via multiple different paths as part of a second connection, second coded packets associated with a second connection via multiple different paths, the second coded packets each including a linear combination of the first coded packets;

the first coded data packets each including a linear combination of original data packets, wherein at least one of the multiple different paths is associated with the first network and at least one different one of the multiple different paths is associated with the second network, the at least one processor configured to:

send an acknowledgement message to the source node for each first coded data packet associated with the first connection that is successfully received;

forward the first coded data packets associated with the first connection, received from all paths, to a common processing layer without first decoding the coded packets; and wherein for each first coded packet associated with the first connection forwarded to the common processing layer:

determine whether the coded packet is linearly independent of coded packets associated with the connection that were previously forwarded to the common processing layer; and send an acknowledgement message to the source node acknowledging that a new degree of freedom has been received for the first connection if the coded packet is determined to be linearly independent:

decode the coded packets to extract original packets; and forward the original packets to an application layer in the destination node.

26. The communication device of claim 25, wherein the at least one processor is configured to discard a received coded packet if it is determined that the packet is not linearly independent.

27. The communication device of claim 25, wherein a first of the multiple different paths is associated with the first network interface unit and a second of the multiple different paths is associated with the second network interface unit.

28. The communication device of claim 25, further comprising:

at least one additional network interface unit configured for communication within at least one additional network.

* * * * *